US012691566B2

(12) United States Patent
Xu et al.

(10) Patent No.: US 12,691,566 B2
(45) Date of Patent: Jul. 28, 2026

(54) POWER TOOL

(71) Applicant: Nanjing Chervon Industry Co., Ltd., Nanjing (CN)

(72) Inventors: Yanqing Xu, Nanjing (CN); Wenjing Lu, Nanjing (CN); Yicong Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 19/314,229

(22) Filed: Aug. 29, 2025

(65) Prior Publication Data

US 2025/0387897 A1      Dec. 25, 2025

Related U.S. Application Data

(63) Continuation of application No. PCT/CN2024/081097, filed on Mar. 12, 2024.

(30) Foreign Application Priority Data

Mar. 21, 2023   (CN) .......................... 202310274908.0
Mar. 21, 2023   (CN) .......................... 202310276447.0
Mar. 21, 2023   (CN) .......................... 202310281510.X

(51) Int. Cl.
  *B25F 5/02*         (2006.01)
  *H02K 7/14*         (2006.01)
  *H02P 21/22*        (2016.01)
(52) U.S. Cl.
  CPC .............. *B25F 5/02* (2013.01); *H02K 7/145* (2013.01); *H02P 21/22* (2016.02)

(58) Field of Classification Search
  CPC .... B25F 5/02; B25F 5/00; B25F 5/001; H02P 21/22; H02P 6/28; H02P 6/10; H02P 29/40; H02P 6/15; H02P 21/18; H02P 27/06; H02P 6/06; H02P 2006/045;
  (Continued)

(56) References Cited

FOREIGN PATENT DOCUMENTS

| CN | 106505527 A |   | 3/2017 |   |   |
|----|-------------|---|--------|---|---|
| CN | 104993761 A |   | 2/2018 |   |   |
| CN | 108233697 A | * | 6/2018 | ............. | H02K 7/145 |

(Continued)

OTHER PUBLICATIONS

Machine Translation of CN 108233697 A (Year: 2018).*
International Search Report and Written Opinion of application No. PCT/CN24/81097, dated May 22, 2024, 16 pp.

*Primary Examiner* — Veronica Martin
(74) *Attorney, Agent, or Firm* — Greenberg Traurig, LLP

(57)               ABSTRACT

A power tool includes a housing, an electric motor, a power supply device, a driver circuit, a controller, a first capacitor, and a voltage collection device. The power supply device is used for outputting a power signal to the driver circuit; and the driver circuit is used for outputting a drive signal to the electric motor according to the power signal and a control signal provided by the controller. The first capacitor is connected in parallel between the power supply device and the driver circuit. The voltage collection device is used for collecting a bus voltage signal at the front end of the driver circuit and transmitting the bus voltage signal to the controller. The controller can control the duty cycle of the control signal to decrease when the amplitude of the bus voltage is greater than a preset amplitude.

20 Claims, 15 Drawing Sheets

(58) Field of Classification Search
     CPC .... H02P 2203/09; H02K 7/145; H02K 11/26;
               H02K 11/33; H02K 19/10; H02K 29/03
     See application file for complete search history.

(56)                    References Cited

FOREIGN PATENT DOCUMENTS

| CN | 107947684 | A  | 8/2019  |
|----|-----------|----|---------|
| CN | 108233697 | B  | 4/2020  |
| CN | 114448297 | A  | 5/2022  |
| CN | 110753603 | A  | 9/2022  |
| WO | 2022237307 | A1 | 11/2022 |

\* cited by examiner

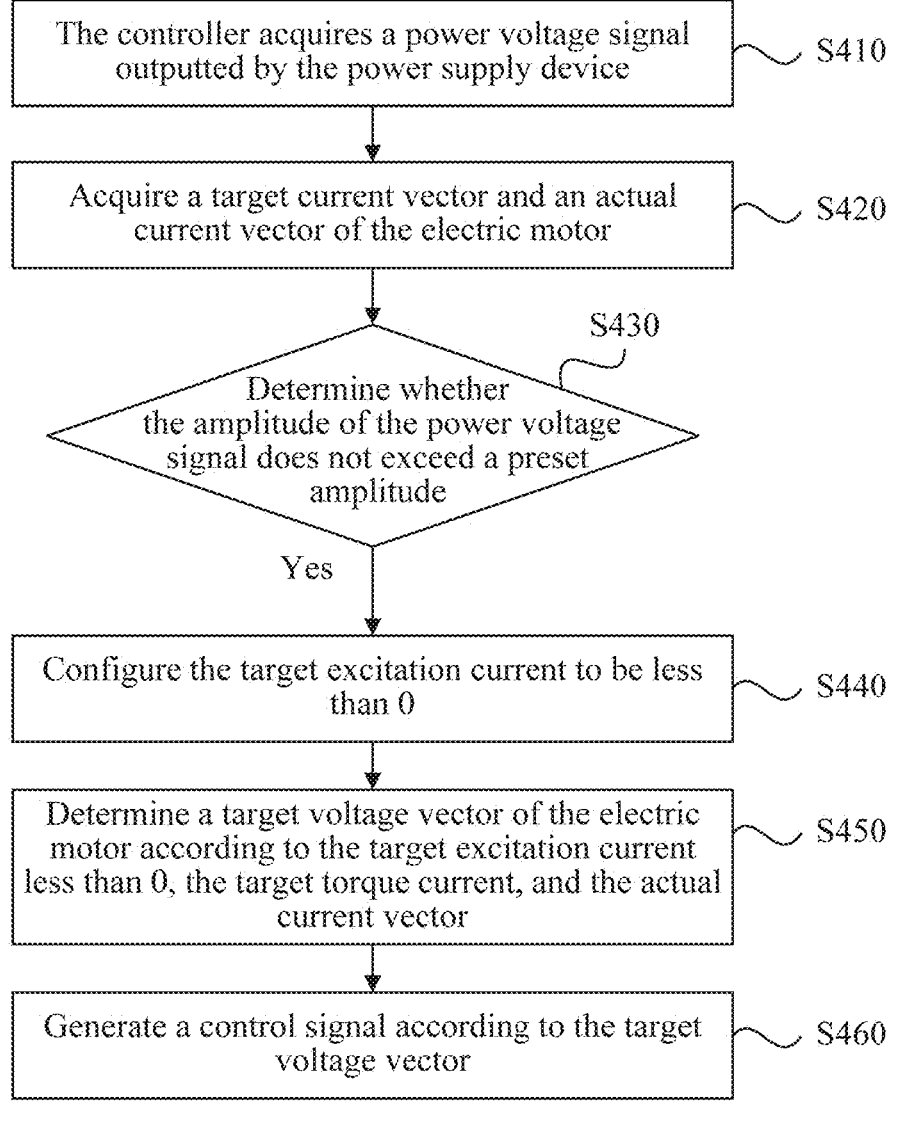

The controller acquires a power voltage signal outputted by the power supply device —— S410

Acquire a target current vector and an actual current vector of the electric motor —— S420

S430
Determine whether the amplitude of the power voltage signal does not exceed a preset amplitude Yes Configure the target excitation current to be less than 0 —— S440

Determine a target voltage vector of the electric motor according to the target excitation current less than 0, the target torque current, and the actual current vector —— S450

Generate a control signal according to the target voltage vector —— S460

FIG. 18

POWER TOOL

RELATED APPLICATION INFORMATION

This application is a continuation of International Application Number PCT/CN2024/081097, filed on Mar. 12, 2024, through which this application also claims the benefit under 35 U.S.C. § 119 (a) of Chinese Patent Application No. 202310281510.X, filed on Mar. 21, 2023, Chinese Patent Application No. 202310274908.0, filed on Mar. 21, 2023, and Chinese Patent Application No. 202310276447.0, filed on Mar. 21, 2023, which applications are incorporated herein by reference in their entireties.

TECHNICAL FIELD

The present application relates to the technical field of power tool control and, in particular, to a power tool.

BACKGROUND

The existing power tool usually uses a traditional square-wave control driver circuit, and the speed and torque of the electric motor in the power tool are controlled through the driver circuit by adjusting the duty cycle of the square wave signal.

To improve the power factor, a capacitor is usually provided in the circuit. The capacitor causes the bus voltage to have a spike, that is, a voltage pulse with a larger amplitude, resulting in a risk of burning out the electric motor during the process of driving the electric motor to rotate.

SUMMARY

According to an aspect of the present application, a power tool is provided. The power tool includes a housing, an electric motor, a power supply device, a driver circuit, a controller, a first capacitor, and a voltage collection device. The electric motor is disposed in the housing and includes stator windings and a rotor rotating about the stator windings. The driver circuit includes multiple electronic switches electrically connected between the power supply device and the electric motor, and the control terminals of the multiple electronic switches are electrically connected to the controller. The power supply device is used for outputting a power signal to the driver circuit; and the driver circuit is used for outputting a drive signal to the electric motor according to the power signal and a control signal provided by the controller. The first capacitor is connected in parallel between the power supply device and the driver circuit. The voltage collection device is used for collecting a bus voltage signal at the front end of the driver circuit and transmitting the bus voltage signal to the controller. The controller includes an amplitude acquisition module and a first control signal adjustment module. The amplitude acquisition module is used for acquiring the bus voltage signal provided by the voltage collection device and determining the amplitude of a bus voltage according to the bus voltage signal. The first control signal adjustment module is used for controlling the duty cycle of the control signal to decrease when the amplitude of the bus voltage is greater than a preset amplitude.

In an example, the ratio of the capacitance of the first capacitor to the output power of the power tool does not exceed 0.1 µF/W.

In an example, the first control signal adjustment module includes a first voltage regulation unit for controlling the amplitude of a target voltage to decrease when the amplitude of the bus voltage is greater than the preset amplitude; and a first control signal generation unit for generating the control signal according to the decreased target voltage.

In an example, the controller includes a second control signal adjustment module, where the second control signal adjustment module is used for controlling the duty cycle of the control signal to increase when the amplitude of the bus voltage is less than the preset amplitude.

In an example, the second control signal adjustment module includes a second voltage regulation unit for controlling the amplitude of a target voltage to increase when the amplitude of the bus voltage is less than the preset amplitude; and a second control signal generation unit for generating the control signal according to the increased target voltage.

In an example, the power tool further includes a current detection module, a rotational speed detection module, and a target rotational speed acquisition module, where the current detection module is used for acquiring a sampled current of the electric motor and outputting the sampled current to the controller; the rotational speed detection module is used for acquiring a real-time rotational speed of the electric motor and sending the real-time rotational speed to the controller; and the target rotational speed acquisition module is used for acquiring a target rotational speed of the electric motor and sending the target rotational speed to the controller.

In an example, the controller further includes a target voltage acquisition module for acquiring a target voltage according to the sampled current, the real-time rotational speed, and the target rotational speed.

In an example, the target voltage acquisition module includes a direct-axis target voltage acquisition unit for acquiring a direct-axis target voltage according to a direct-axis target current and a direct-axis feedback current; and a quadrature-axis target voltage acquisition unit for acquiring a quadrature-axis target voltage according to a quadrature-axis target current and a quadrature-axis feedback current.

In an example, the target voltage acquisition module includes a target current acquisition unit and a feedback current acquisition unit, where the target current acquisition unit is used for acquiring the real-time rotational speed and the target rotational speed of the electric motor and acquiring the direct-axis target current and the quadrature-axis target current according to the target rotational speed and the real-time rotational speed; and the feedback current acquisition unit is used for acquiring the sampled current of the electric motor and acquiring the direct-axis feedback current and the quadrature-axis feedback current according to the real-time rotational speed.

In an example, the first control signal generation unit includes a first control quantity acquisition subunit for acquiring the first voltage control quantity and the second voltage control quantity according to the decreased target voltage; and a first control signal generation subunit for acquiring the control signal according to the first voltage control quantity and the second voltage control quantity.

A power tool includes a housing, an electric motor, a power supply device, a driver circuit, a current detection module, and a controller. The electric motor is disposed in the housing and includes stator windings and a rotor rotating about the stator windings. The driver circuit includes multiple electronic switches electrically connected between the power supply device and the electric motor, and the control terminals of the multiple electronic switches are electrically connected to the controller. The power supply device is used for supplying power to the controller and the driver circuit. The driver circuit is used for outputting a drive signal to the electric motor according to a power signal and a control signal provided by the controller. The current detection module is used for acquiring a detection current of the electric motor and sending the detection current to the controller. The controller includes a detection current acquisition module, a vector detection current acquisition module, and a first control module. The detection current acquisition module is used for acquiring the detection current provided by the current detection module. The vector detection current acquisition module is used for acquiring an actual torque current and an actual excitation current of the electric motor according to the detection current. The first control module is used for controlling the multiple electronic switches to be turned off simultaneously in the current control cycle when the actual torque current in the previous control cycle is greater than a first current threshold and/or when the actual excitation current in the previous control cycle is greater than a second current threshold.

In an example, the first control module is further used for controlling the multiple electronic switches to be turned on in groups in the next control cycle after the current control cycle ends.

In an example, the first control module is further used for, after controlling the multiple electronic switches to be turned off simultaneously in the current control cycle, when determining that the actual torque current in the current control cycle does not exceed the first current threshold and the actual excitation current in the current control cycle does not exceed the second current threshold, controlling the multiple electronic switches to be turned on in groups in the next control cycle.

A power tool includes a housing, an electric motor, a power supply device, a driver circuit, a current detection module, and a controller. The electric motor is disposed in the housing and includes stator windings and a rotor rotating about the stator windings. The driver circuit includes multiple electronic switches electrically connected between the power supply device and the electric motor, and the control terminals of the multiple electronic switches are electrically connected to the controller. The power supply device is used for supplying power to the controller and the driver circuit. The driver circuit is used for outputting a drive signal to the electric motor according to a power signal and a control signal provided by the controller. The current detection module is used for acquiring a detection current of the electric motor and sending the detection current to the controller. The controller includes a detection current acquisition module, a vector detection current acquisition module, and a second control module. The detection current acquisition module is used for acquiring the detection current provided by the current detection module. The vector detection current acquisition module is used for acquiring an actual torque current and an actual excitation current of the electric motor according to the detection current. The second control module is used for, when the actual torque current in the current control cycle is greater than a first current threshold and/or when the actual excitation current in the current control cycle is greater than a second current threshold, controlling the multiple electronic switches to be turned off simultaneously during the remaining time in the current control cycle.

In an example, the second control module is further used for controlling the multiple electronic switches to be turned on in groups in the next control cycle after the current control cycle ends.

In an example, the second control module is further used for, after controlling the multiple electronic switches to be turned off simultaneously in the current control cycle, when determining that the actual torque current in the next control cycle does not exceed the first current threshold and the actual excitation current in the next control cycle does not exceed the second current threshold, controlling the multiple electronic switches to be turned on in groups in the next control cycle.

In an example, a rotational speed detection module and a target rotational speed acquisition module are further included, where the rotational speed detection module is used for acquiring a real-time rotational speed of the electric motor and sending the real-time rotational speed to the controller; and the target rotational speed acquisition module is used for acquiring a target rotational speed of the electric motor and sending the target rotational speed to the controller.

In an example, the controller further includes a target current acquisition module for acquiring the real-time rotational speed and the target rotational speed of the electric motor and determining a target current according to the target rotational speed; and a vector target current acquisition module for acquiring a target torque current and a target excitation current according to the target current.

In an example, when the controller includes a first control module, the first control module includes: a target torque voltage acquisition unit for acquiring a target torque voltage according to a target torque current and the actual torque current in the current control cycle; a target excitation voltage acquisition unit for acquiring a target excitation voltage according to a target excitation current and the actual excitation current in the current control cycle; a first control quantity generation control unit for generating a first voltage control quantity and a second voltage control quantity according to the actual torque current and the actual excitation current in the previous control cycle and the target torque voltage and the target excitation voltage in the current control cycle; and a first PWM control signal generation unit for outputting a pulse-width modulation (PWM) control signal according to the first voltage control quantity and the second voltage control quantity.

In an example, when the controller includes a second control module, the second control module includes: a direct-axis target voltage acquisition unit for acquiring a target torque voltage according to a target torque current and the actual torque current in the current control cycle; a target excitation voltage acquisition unit for acquiring a target excitation voltage according to a target excitation current and the actual excitation current in the current control cycle; a second control quantity generation control unit for generating a third voltage control quantity and a fourth voltage control quantity according to the actual torque current, the actual excitation current, the target torque voltage, and the target excitation voltage in the current control cycle; and a second PWM control signal generation unit for outputting a PWM control signal according to the third voltage control quantity and the fourth voltage control quantity.

A control method for a power tool is provided, where the power tool includes a housing, an electric motor, a power supply device, a driver circuit, and a controller; the electric motor is disposed in the housing; the electric motor includes stator windings and a rotor rotating about the stator windings; the driver circuit includes multiple electronic switches electrically connected between the power supply device and the electric motor, and the control terminals of the multiple electronic switches are electrically connected to the controller; the power supply device is used for outputting a power voltage signal to the driver circuit; the driver circuit is used for outputting a drive signal to the electric motor according to a power signal and a control signal provided by the controller; and the method includes: acquiring, by the controller, the power voltage signal outputted by the power supply device; acquiring a target voltage vector provided to the electric motor; determining whether the amplitude of the power voltage signal does not exceed a preset amplitude; if the amplitude of the power voltage signal does not exceed the preset amplitude, overmodulating the target voltage vector and generating a modulated voltage vector; and generating the control signal according to the modulated voltage vector.

In an example, before the target voltage vector is over-modulated and the modulated voltage vector signal is generated, the method further includes: acquiring a rotational direction signal of the electric motor; determining whether the rotational direction of the electric motor is reverse according to the rotational direction signal; and if the rotational direction of the electric motor is reverse, over-modulating the target voltage vector and generating the modulated voltage vector.

In an example, the step of acquiring the target voltage vector provided to the electric motor includes: acquiring a target current vector and an actual current vector of the electric motor; and determining the target voltage vector according to the target current vector and the actual current vector; where the target current vector includes a target excitation current and a target torque current; and the actual current vector includes an actual excitation current and an actual torque current.

In an example, the step of determining the target voltage vector according to the target current vector and the actual current vector includes: determining a target excitation voltage according to the target excitation current and the actual excitation current, and determining a target torque voltage according to the target torque current and the actual torque current.

A control method for a power tool is provided, where the power tool includes a housing, an electric motor, a power supply device, a driver circuit, and a controller; the electric motor is disposed in the housing; the electric motor includes stator windings and a rotor rotating about the stator windings; the driver circuit includes multiple electronic switches electrically connected between the power supply device and the electric motor, and the control terminals of the multiple electronic switches are electrically connected to the controller; the power supply device is used for outputting a power signal to the driver circuit; the driver circuit is used for outputting a drive signal to the electric motor according to the power signal and a control signal provided by the controller; and the method includes: acquiring, by the controller, a power voltage signal outputted by the power supply device; acquiring a target current vector and an actual current vector of the electric motor, where the target current vector includes a target excitation current and a target torque current, and the actual current vector includes an actual excitation current and an actual torque current; determining whether the amplitude of the power voltage signal does not exceed a preset amplitude; if the amplitude of the power voltage signal does not exceed the preset amplitude, configuring the target excitation current to be less than 0;

determining a target voltage vector of the electric motor according to the target excitation current less than 0, the target torque current, and the actual current vector; and generating the control signal according to the target voltage vector.

In an example, the step of acquiring the target current vector of the electric motor includes: acquiring a real-time rotational speed and a target rotational speed of the electric motor; determining a target current according to the real-time rotational speed and the target rotational speed; and determining the target excitation current and the target torque current according to the target current. The step of acquiring the actual current vector of the electric motor includes: acquiring a detection current of the electric motor; and determining the actual excitation current and the actual torque current according to the detection current.

A control device for a power tool is provided, where the power tool includes a housing, an electric motor, a power supply device, a driver circuit, and a controller; the electric motor is disposed in the housing; the electric motor includes stator windings and a rotor rotating about the stator windings; the driver circuit includes multiple electronic switches electrically connected between the power supply device and the electric motor, and the control terminals of the multiple electronic switches are electrically connected to the controller; the power supply device is used for outputting a power voltage signal to the driver circuit; the driver circuit is used for outputting a drive signal to the electric motor according to a power signal and a control signal provided by the controller; and the control device for a power tool is integrated into the controller and includes: a first voltage acquisition module for acquiring the power voltage signal outputted by the power supply device; a first target voltage vector acquisition module for acquiring a target voltage vector provided to the electric motor; a first amplitude determination module for determining whether the amplitude of the power voltage signal does not exceed a preset amplitude; a modulated voltage vector generation module for overmodulating the target voltage vector and generating a modulated voltage vector when the first amplitude determination module determines that the amplitude of the power voltage signal does not exceed the preset amplitude; and a first control signal generation module for generating the control signal according to the modulated voltage vector.

A control device for a power tool is provided, where the power tool includes a housing, an electric motor, a power supply device, a driver circuit, and a controller; the electric motor is disposed in the housing; the electric motor includes stator windings and a rotor rotating about the stator windings; the driver circuit includes multiple electronic switches electrically connected between the power supply device and the electric motor, and the control terminals of the multiple electronic switches are electrically connected to the controller; the power supply device is used for outputting a power voltage signal to the driver circuit; the driver circuit is used for outputting a drive signal to the electric motor according to the power voltage signal and a control signal provided by the controller; and the control device for a power tool is integrated into the controller and includes: a second voltage signal acquisition module integrated into the controller and used for the controller to acquire the power voltage signal outputted by the power supply device; a target current vector acquisition module for acquiring a target current vector of the electric motor, where the target current vector includes a target excitation current and a target torque current; an actual current vector acquisition module for acquiring an actual current vector of the electric motor, where the actual current vector includes an actual excitation current and an actual torque current; a second amplitude determination module for determining whether the amplitude of the power voltage signal does not exceed a preset amplitude; a flux-weakening modulation module for configuring the target excitation current to be less than 0 when the second amplitude determination module determines that the amplitude of the power voltage signal does not exceed the preset amplitude; a target voltage vector determination module for determining a target voltage vector of the electric motor according to the target excitation current less than 0, the target torque current, and the actual current vector; and a second control signal generation module for generating the control signal according to the target voltage vector.

A power tool includes a housing, an electric motor, a power supply device, a driver circuit, and a controller. The electric motor is disposed in the housing. The electric motor includes stator windings and a rotor rotating about the stator windings. The driver circuit includes multiple electronic switches electrically connected between the power supply device and the electric motor, and the control terminals of the multiple electronic switches are electrically connected to the controller. The power supply device is used for outputting a power voltage signal to the driver circuit. The driver circuit is used for outputting a drive signal to the electric motor according to a power signal and a control signal provided by the controller. The controller is used for performing the preceding control method for a power tool.

In an example, a rotational speed detection module for acquiring a real-time rotational speed of the electric motor and sending the real-time rotational speed to the controller and a current detection module for acquiring a detection current of the electric motor and outputting the detection current to the controller are further included.

BRIEF DESCRIPTION OF THE DRAWINGS

FIG. 18 is a flowchart of a control method for a power tool according to example four of the present application.

DETAILED DESCRIPTION

Figure 1:
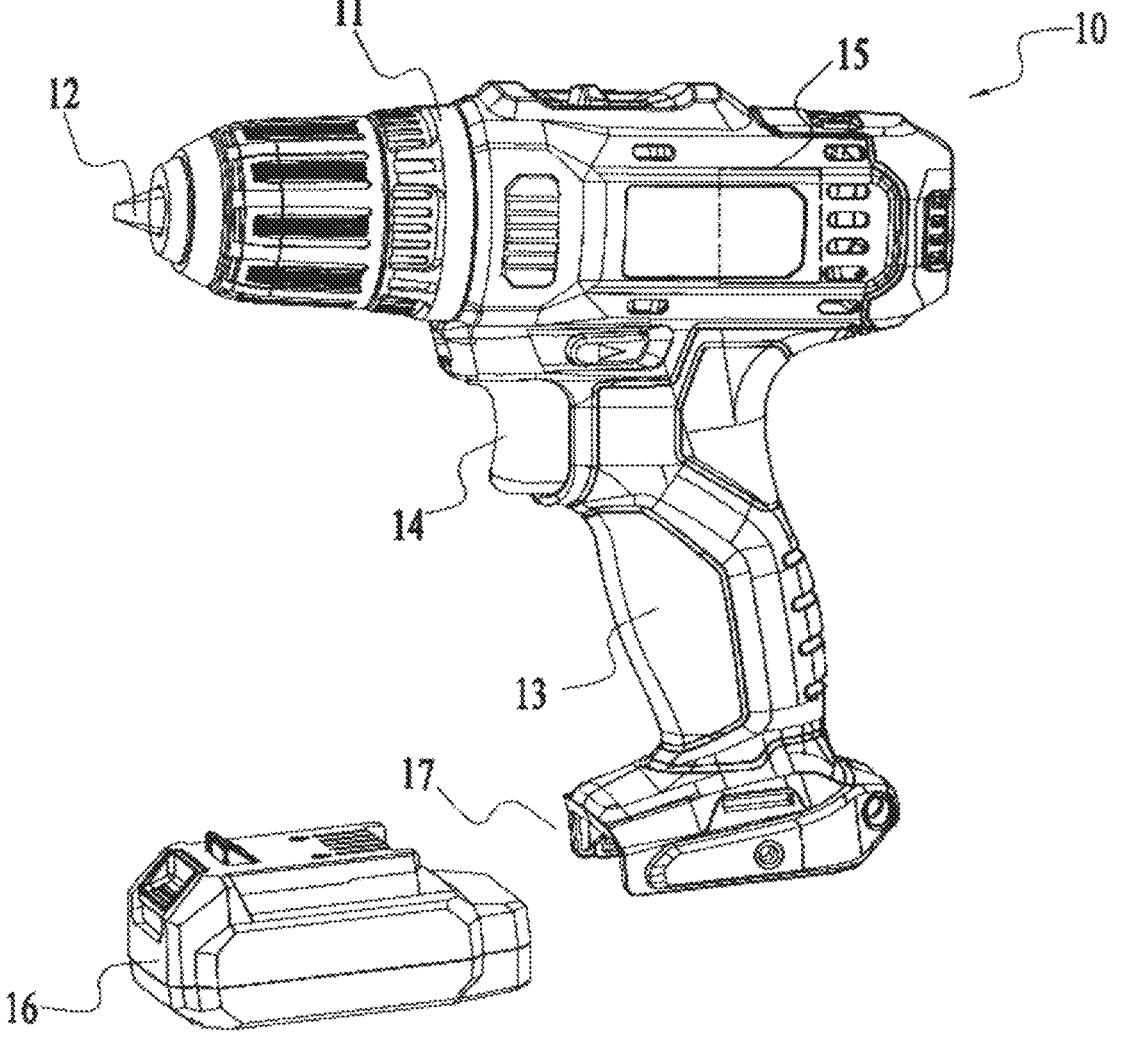
FIG. 1 is a structural view of a power tool according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings. In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

A power tool in the present application may be a handheld power tool, a garden tool, or a garden vehicle such as a vehicle-type mower, which is not limited herein. The power tool in the present application includes, but is not limited to, a power tool that requires speed regulation, such as a screwdriver, an electric drill, a wrench, and an angle grinder, a sander and another power tool that may be used for grinding workpieces, a reciprocating saw, a circular saw, a jigsaw, and the like that may be used for cutting workpieces, and an electric hammer and another power tool that may be used for impact. These tools may also be garden tools, such as a hedge trimmer, a chainsaw, or a vehicle-type mower. Additionally, these tools such as a blender may also be used for other purposes. As long as these power tools can adopt the essence of the technical solutions disclosed below, these power tools are within the scope of the present application.

FIG. 1 is a structural view of a power tool according to an example of the present application. As shown in FIG. 1, the power tool includes a housing 11, an electric motor 15, and a power supply device 16. The electric motor 15 is disposed in the housing 11. The electric motor 15 includes stator windings and a rotor rotating about the stator windings.

Specifically, the housing 11 can form an accommodation space for accommodating the electric motor 15, a transmission mechanism, and other electronic components such as a circuit board, the housing 11 is the main part of the power tool 10, and the housing 11 may be formed with a grip 13 for the user to hold. The electric motor 15 can convert electrical energy into power which is transmitted to a functional piece 12. The functional piece 12 may be mounted at the front end of the housing 11.

The electric motor 15 includes stator windings and a rotor rotating about the stator windings. In some examples, the electric motor 15 is a three-phase brushless motor including the rotor with a permanent magnet and three-phase stator windings U, V, and W electronically commutated. In some examples, the three-phase stator windings U, V, and W adopt a star connection. In some other examples, the three-phase stator windings U, V, and W adopt a delta connection. However, it is to be understood that other types of brushless motors are also within the scope of the present disclosure. The brushless motor may include less than or more than three phases.

The functional piece 12 is used for implementing a function of the power tool 10, and the functional piece 12 is driven by the electric motor 15 to operate. Specifically, the functional piece 12 may be driven by the electric motor 15 through an output shaft and the transmission mechanism. Different power tools have different functional pieces. For example, as for the electric drill, the functional piece 12 is a drill bit (not shown) and used for implementing a drilling function.

The power supply device 16 is used for supplying electrical energy to the power tool 10. In the example of the present application, a battery pack is used for supplying power to the power tool 10. The power tool 10 may include a tool mating portion 17 through which the battery pack is connected to the power tool. The above is merely illustrative and does not limit the present application. In other examples, the power supply device 16 may be an alternating current power supply, that is, the alternating current power supply is used for supplying power to the power tool. Optionally, the alternating current power supply is alternating current mains power of 120 V or 220 V. In this case, the power supply device 16 may include a power supply conversion unit that is connected to an alternating current and used for converting the alternating current into a direct current usable by the power tool.

The power tool may further include a speed regulation mechanism 14 that is at least used for setting the target rotational speed of the electric motor 15, that is to say, the speed regulation mechanism 14 is used for speed regulation of the electric motor 15. The speed regulation mechanism 14 may be, but is not limited to, a trigger, a knob, or the like. In the example of the present application, the speed regulation mechanism 14 is configured to be a trigger structure.

Figure 2:
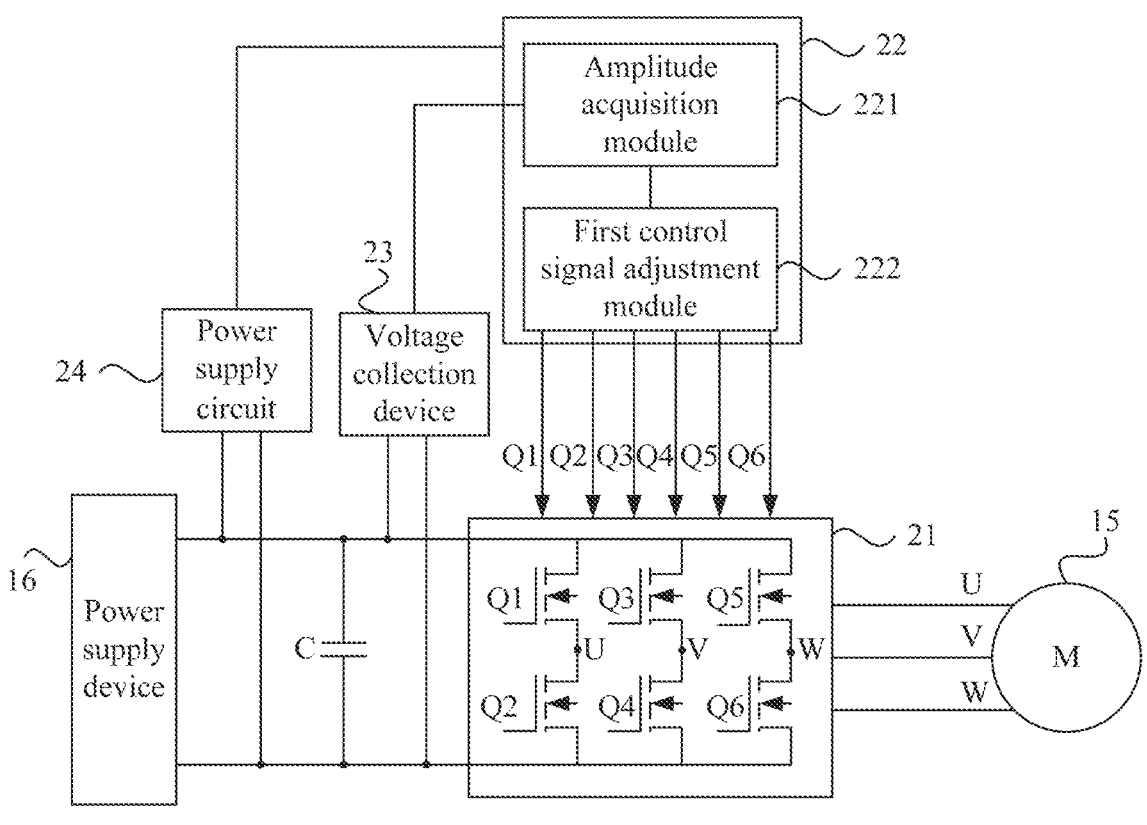
FIG. 2 is a structural diagram of the circuitry of a power tool according to an example of the present application.

Based on the preceding power tool, FIG. 2 is a structural diagram of the circuitry of a power tool according to an example of the present application. In conjunction with FIGS. 1 and 2, the circuitry of the power tool includes a driver circuit 21, a controller 22, a first capacitor C, and a voltage collection device 23. The driver circuit 21 includes multiple electronic switches (Q1, Q2, Q3, Q4, Q5, and Q6)

electrically connected between the power supply device 16 and the electric motor 15, and the control terminals of the electronic switches are electrically connected to the controller 22. The power supply device 16 is used for outputting a power signal to the driver circuit 21. The driver circuit 21 is used for outputting a drive signal to the electric motor 15 according to the power signal and a control signal provided by the controller 22. The first capacitor C is connected in parallel between the power supply device 16 and the driver circuit 21. The voltage collection device 23 is used for collecting a bus voltage signal at the front end of the driver circuit 21 and transmitting the bus voltage signal to the controller 22. The controller 22 includes an amplitude acquisition module 221 and a first control signal adjustment module 222. The amplitude acquisition module 221 is used for acquiring the bus voltage signal provided by the voltage collection device 23 and determining the amplitude of the bus voltage according to the bus voltage signal. The first control signal adjustment module 222 is used for controlling the duty cycle of the control signal to decrease when the amplitude of the bus voltage is greater than a preset amplitude.

Specifically, the driver circuit 21 may include multiple electronic switches. The electronic switches may be field-effect transistors (FETs) or insulated-gate bipolar transistors (IGBTs). In some examples, the driver circuit 21 is a three-phase bridge circuit formed by six electronic switches. For example, the driver circuit may include a first electronic switch Q1, a second electronic switch Q2, a third electronic switch Q3, a fourth electronic switch Q4, a fifth electronic switch Q5, and a sixth electronic switch Q6. The first electronic switch Q1, the third electronic switch Q3, and the fifth electronic switch Q5 may serve as high-side drive switches. The second electronic switch Q2, the fourth electronic switch Q4, and the sixth electronic switch Q6 may serve as low-side drive switches. The three electronic switches Q1, Q3, and Q5 as the high-side drive switches are disposed between a power supply bus and stator windings of the electric motor 15, respectively. The three electronic switches Q2, Q4, and Q6 as the low-side drive switches are disposed between the stator windings of the electric motor 15 and a ground wire, respectively.

The controller 22 may include control signal output terminals in one-to-one correspondence with the control terminals of the electronic switches (that is, the gates of the transistors). When the power tool operates, the controller 22 outputs control signals to the electronic switches through the control signal output terminals, thereby controlling the electronic switches to be turned on or off at a certain frequency. In this manner, power can be outputted to the stator windings of the electric motor 15 so that the electric motor 15 can output torque.

For example, the power supply system of the power tool may further include a power supply circuit 24 for supplying power to at least the controller 22. The power supply circuit 24 is electrically connected to the power supply device 16 to convert the electrical energy of the power supply device 21 into a power supply voltage adapted to the controller 22 and output the power supply voltage. For example, in some examples, the power supply circuit 24 reduces the voltage from the power supply device 16 to 15 V to supply power to the controller 22.

As introduced in the background, the load of the driver circuit 21 is an inductive load (the stator windings of the electric motor may be regarded as the inductive load), causing a phase difference between each phase current and the corresponding phase voltage and reducing the active power of the circuit. Based on this, the first capacitor C may be provided between the power supply device 16 and the driver circuit 21 such that the first capacitor C is connected in parallel with the driver circuit 21. In this manner, the phase difference between each phase current and the corresponding phase voltage can be reduced to a large extent, thereby effectively improving the power factor of the circuit.

The first capacitor C is provided so that the bus voltage (that is, the power supply voltage provided by the power supply device 16 to the driver circuit 21 through the power supply bus) has a spike. Especially when the capacitance of the first capacitor C is smaller, the amplitude of the spike is larger. The presence of the spike may cause the voltage and/or current provided by the driver circuit 21 to the electric motor 15 to be too large, posing a risk of burning out the electric motor 15. Based on this, in the example of the present application, the voltage collection device 23 for collecting the bus voltage signal at the front end of the driver circuit 21 is provided. The collection end of the voltage collection device 23 may be electrically connected to the power supply bus between the first capacitor C and the driver circuit 21, and the output end of the voltage collection device 23 may be electrically connected to the controller 22. In this manner, the voltage collection device 23 can collect the bus voltage signal received by the driver circuit 21 and can output the bus voltage signal to the controller 22. The amplitude acquisition module 221 and the first control signal adjustment module 222 may be provided in the controller 22. The amplitude acquisition module 221 can determine the amplitude of the bus voltage according to the bus voltage signal, and the first control signal adjustment module 222 may compare the amplitude of the bus voltage with the preset amplitude. The preset amplitude may be the voltage amplitude that the bus voltage should provide. If the amplitude of the bus voltage is greater than the preset amplitude, it may be determined that the bus voltage is too large and a voltage spike occurs. In this case, the duty cycle of the control signal may be controlled to decrease so that it is ensured that the voltage and/or current (drive signal) outputted by the driver circuit 21 remain normal when a voltage spike occurs in the bus voltage, thereby indirectly smoothing the bus voltage.

For example, the control signals outputted by the controller 22 to the electronic switches in the driver circuit 21 may be PWM signals. When the controller 22 determines that the bus voltage signal is too large, the duty cycles of the PWM signals may be adjusted to decrease so that the voltage and/or current provided by the driver circuit 21 to the electric motor 15 can be maintained within normal ranges, and the bus voltage can be indirectly smoothed. When it is determined that the bus voltage signal returns to normal, the duty cycles of the PWM signals may be controlled to be restored to the previous duty cycles to prevent the duty cycles of the PWM signals from decreasing for a long time, resulting in insufficient power outputted by the driver circuit 21 to the electric motor, reducing the torque outputted by the electric motor, and failing to satisfy the working requirements of the power tool.

In the power tool provided in the example of the present application, the power supply device provides the power signal, the controller controls the electronic switches in the driver circuit to be turned on or off, and the driver circuit outputs the drive signal to the electric motor according to the power signal and the control signal, thereby driving the electric motor. Moreover, the first capacitor is connected in parallel between the power supply device and the driver circuit to improve the power factor of the circuitry. Based on this, the voltage collection device is configured to collect the bus voltage signal at the front end of the driver circuit and provide the bus voltage signal to the controller so that the amplitude acquisition module in the controller can determine the amplitude of the bus voltage according to the bus voltage signal, and when the amplitude of the bus voltage is greater than the preset amplitude, the first control signal adjustment module in the controller can control the duty cycle of the control signal to decrease. In this manner, it can be ensured that the voltage and/or current (drive signal) outputted by the driver circuit remain normal when a voltage spike occurs in the bus voltage, that is, the bus voltage can be indirectly smoothed, thereby effectively preventing the electric motor from burning out due to an abnormal bus voltage.

In an example, referring to FIG. 2, the ratio of the capacitance of the first capacitor C to the output power of the power tool does not exceed 0.1 μF/W. For example, the ratio may be 0.05 μF/W, 0.04 μF/W, 0.03 μF/W, 0.02 μF/W, or the like. In this manner, the capacitance of the first capacitor C may be made smaller so that the requirements for improving the power factor of the circuitry can be satisfied and the power output requirements of the power tool can be satisfied.

Figure 3:
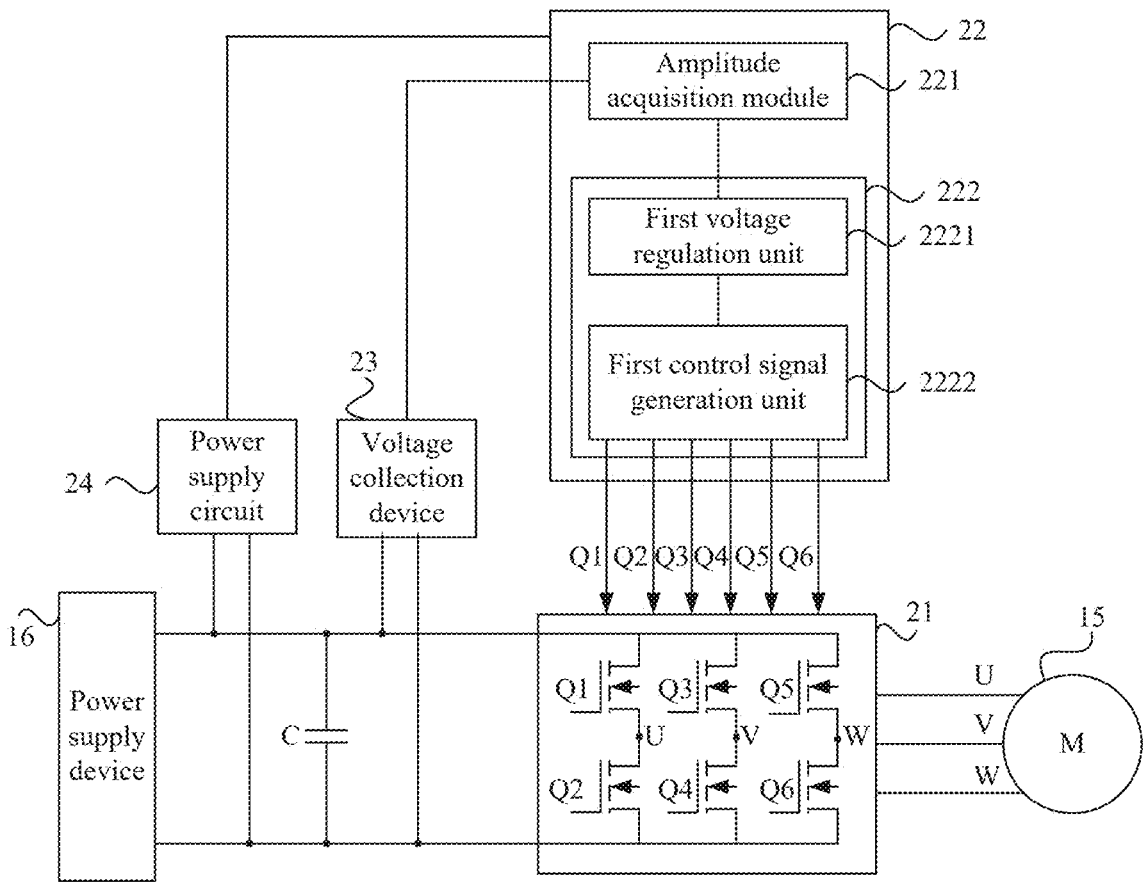
FIG. 3 is a structural diagram of the circuitry of another power tool according to an example of the present application.

In an example, FIG. 3 is a structural diagram of the circuitry of another power tool according to an example of the present application. As shown in FIG. 3, the first control signal adjustment module 222 includes a first voltage regulation unit 2221 for controlling the amplitude of a target voltage to decrease when the amplitude of the bus voltage is greater than the preset amplitude; and a first control signal generation unit 2222 for generating the control signal according to the decreased target voltage.

Specifically, the controller 22 may determine the target voltage according to the target rotational speed and the real-time rotational speed of the electric motor set by the user and then determine, according to the target voltage, the duty cycle of the PWM signal provided to each electronic switch in the driver circuit 21 so that the driver circuit 21 outputs the drive current to the electric motor 15 according to the PWM signal with the duty cycle, thereby making the real-time rotational speed of the electric motor 15 infinitely approach the target rotational speed. Usually, when the real-time rotational speed of the electric motor 15 is greater than the target rotational speed, the controller 22 controls the amplitude of the target voltage to decrease so that the duty cycle of the PWM signal can be reduced, and the drive current outputted by the driver circuit 21 can be reduced, thereby making the rotational speed of the electric motor 15 to decrease to approach the target rotational speed. When the real-time rotational speed of the electric motor 15 is less than the target rotational speed, the controller 22 controls the amplitude of the target voltage to increase so that the duty cycle of the PWM signal can be increased, and the drive current outputted by the driver circuit 21 can be increased, thereby making the rotational speed of the electric motor 15 to increase to approach the target rotational speed.

The first voltage regulation unit 2221 and the first control signal generation unit 2222 may be provided in the first control signal adjustment module 222. The first voltage regulation unit 2221 may compare the amplitude of the bus voltage with the preset amplitude and when it is determined that the amplitude of the bus voltage is greater than the preset amplitude, adjust the amplitude of the target voltage to decrease. Specifically, the amplitude may decrease by a preset step size. In this manner, the first control signal generation unit 2222 may generate the PWM signal according to the decreased target voltage so that the duty cycle of the PWM signal can be reduced, and the drive current outputted by the driver circuit 21 to the electric motor 15 can be reduced. In this manner, the following can be avoided: the drive current outputted by the driver circuit 21 to the electric motor 15 is too large since the PWM signal maintains the original duty cycle, and the electric motor 15 burns out.

Figure 4:
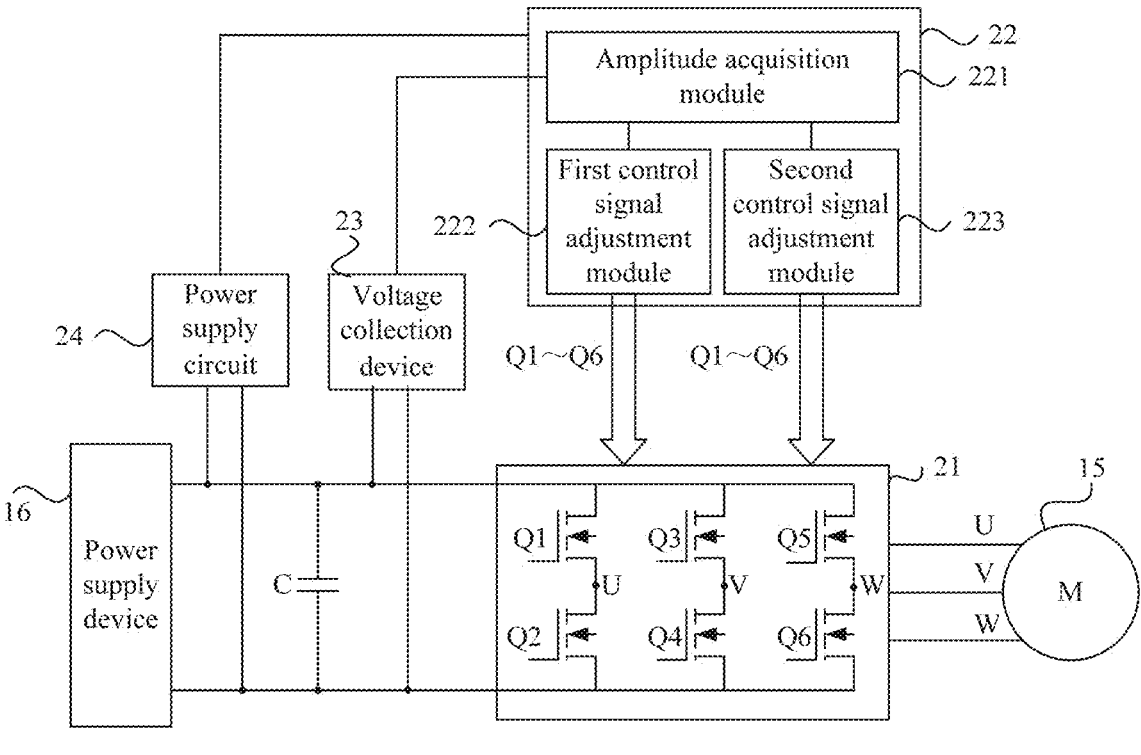
FIG. 4 is a structural diagram of the circuitry of another power tool according to an example of the present application.

In an example, FIG. 4 is a structural diagram of the circuitry of another power tool according to an example of the present application. As shown in FIG. 4, the controller 22 further includes a second control signal adjustment module 223, and the second control signal adjustment module 223 is used for controlling the duty cycle of the control signal to increase when the amplitude of the bus voltage signal is less than the preset amplitude.

Specifically, the second control signal adjustment module 223 may also compare the amplitude of the bus voltage with the preset amplitude. When it is determined that the amplitude of the bus voltage is less than the preset amplitude, it can be determined that the drive current outputted by the driver circuit 21 to the electric motor 15 according to the bus voltage is not sufficient to drive the electric motor 15 to reach the target rotational speed. In this case, the duty cycle of the PWM signal may be controlled to increase to increase the drive current outputted by the driver circuit 21 to the electric motor 15, thereby driving the electric motor 15 to reach the target rotational speed.

Figure 5:
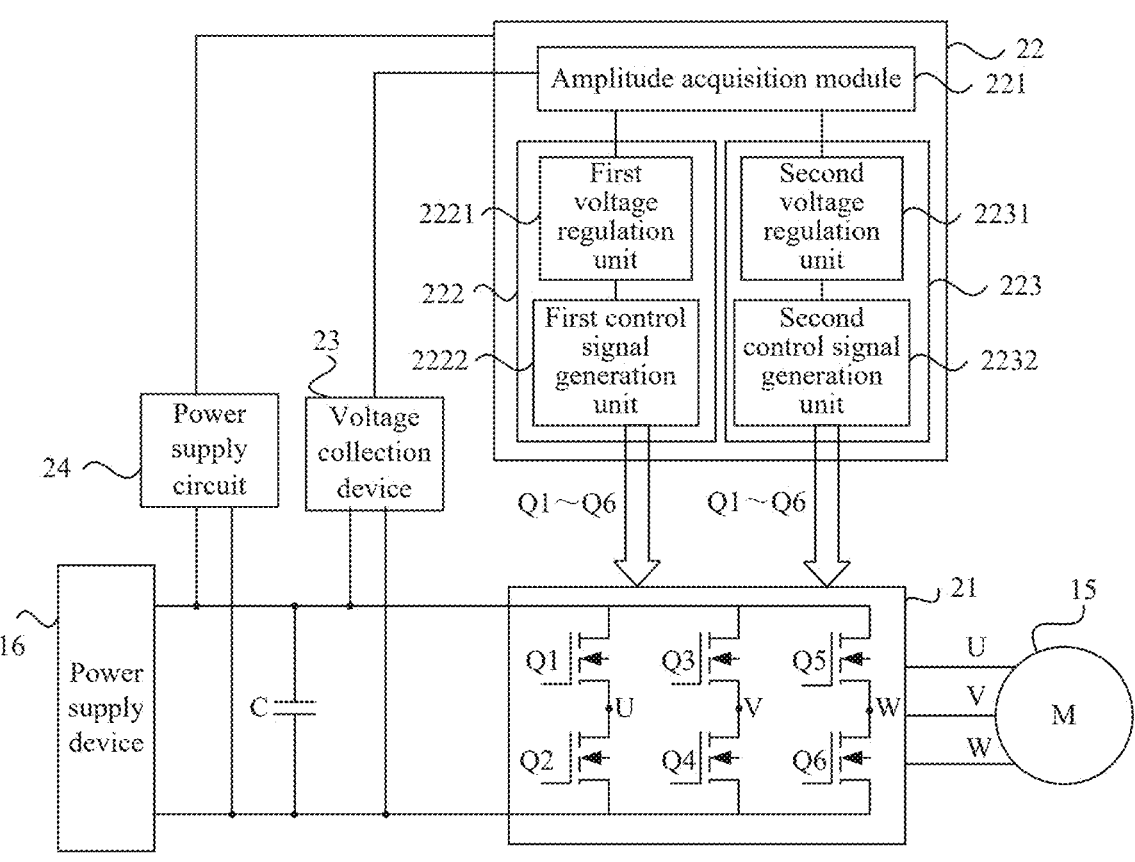
FIG. 5 is a structural diagram of the circuitry of another power tool according to an example of the present application.

In an example, FIG. 5 is a structural diagram of the circuitry of another power tool according to an example of the present application. As shown in FIG. 5, the second control signal adjustment module 223 includes a second voltage regulation unit 2231 for controlling the amplitude of the target voltage to increase when the amplitude of the bus voltage is less than the preset amplitude; and a second control signal generation unit 2232 for generating the control signal according to the increased target voltage.

Specifically, the second voltage regulation unit 2231 and the second control signal generation unit 2232 may be provided in the second control signal adjustment module 223. The second voltage regulation unit 2231 can compare the amplitude of the bus voltage with the preset amplitude and when it is determined that the amplitude of the bus voltage is less than the preset amplitude, control the amplitude of the target voltage to increase by a preset step size so that when the second control signal generation unit 2232 generates the PWM signal according to the increased target voltage, the duty cycle of the PWM signal is also increased accordingly. In this manner, the drive current outputted by the driver circuit 21 according to the PWM signal is also increased, thereby driving the electric motor 15 to increase the rotational speed to output sufficient torque.

Figure 6:
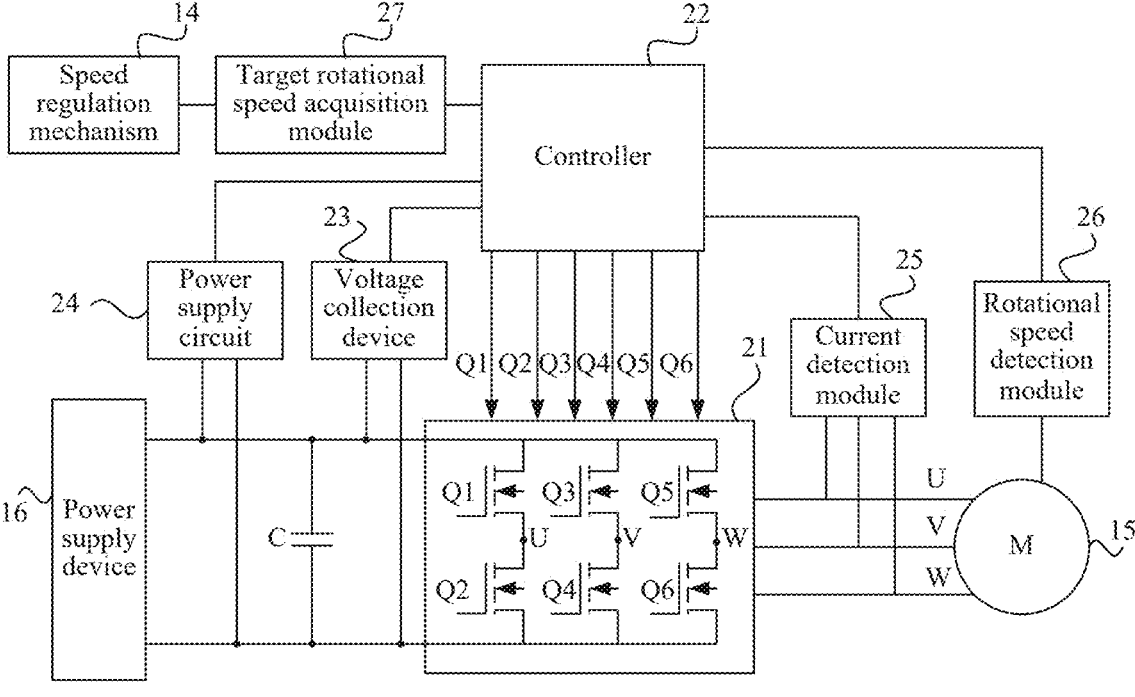
FIG. 6 is a structural diagram of the circuitry of another power tool according to an example of the present application.

In an example, FIG. 6 is a structural diagram of the circuitry of another power tool according to an example of the present application. As shown in FIG. 6, the power mechanism further includes a current detection module 25, a rotational speed detection module 26, and a target rotational speed acquisition module 27. The current detection module 25 is used for acquiring the sampled current of the electric motor 15 and outputting the sampled current to the controller 22. The rotational speed detection module 26 is used for acquiring the real-time rotational speed of the electric motor 15 and sending the real-time rotational speed to the controller 22. The target rotational speed acquisition module 26 is used for acquiring the target rotational speed of the electric motor 15 and sending the target rotational speed to the controller 22.

Specifically, the current detection module 25 may include a Hall current sensor for directly detecting the phase current of each phase winding of the electric motor 15. Alternatively, the current detection module 25 may include a detection resistor for detecting the phase current of each phase winding of the electric motor 15.

Figure 7:
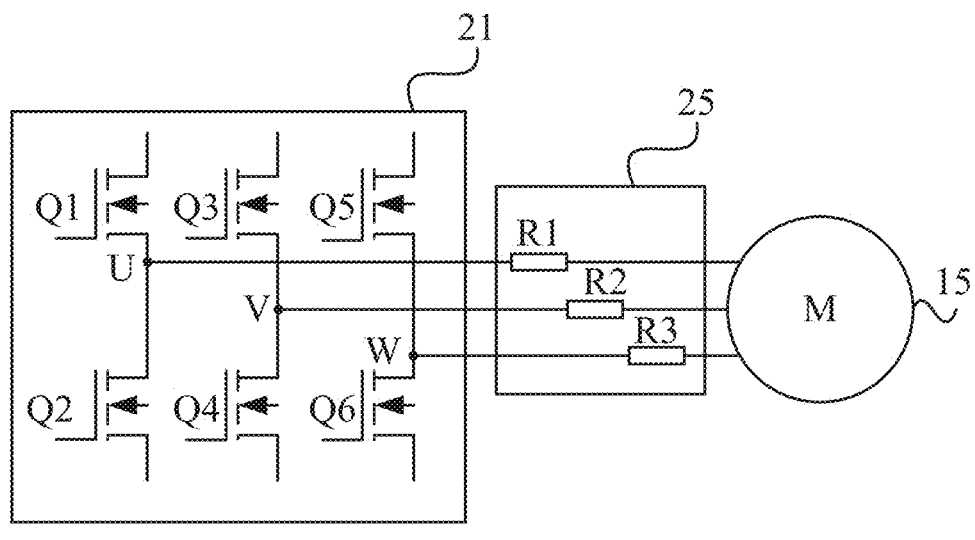
FIG. 7 is a schematic diagram of a circuit structure of a current detection module.

FIG. 7 is a schematic diagram of a circuit structure of a current detection module. As shown in FIG. 7, the current detection module 25 includes detection resistors R1, R2, and R3 connected in series between the driver circuit 21 and the phase windings of the electric motor 15. The current detection module 25 detects the voltages across the detection resistors R1, R2, and R3 to calculate the phase currents of the three-phase stator windings U, V, and W.

The rotational speed detection module 26 is used for acquiring at least one of the measured rotational speed of the electric motor 15 and the position of the rotor. In some examples, the rotational speed detection module 26 includes a sensor (for example, a Hall sensor) that can directly detect the speed and position of the electric motor 15. In some other examples, the rotational speed detection module 26 is configured to estimate the position of the rotor of the electric motor 15 according to at least the phase voltages of the electric motor 15 and the current values of the electronic windings. For example, the inductance of the stator windings is estimated according to the phase voltages of the brushless motor 15 and the currents of the stator windings to establish a one-to-one matching relationship between the inductance and the rotor position (in a table lookup method, a formula modeling, or the like), thereby acquiring the rotor position. The rotational speed is then calculated according to the change in the position of the rotor.

The user may set the target rotational speed through the speed regulation mechanism 14, and the target rotational speed acquisition module 27 may acquire in real time the target rotational speed sent by the speed regulation mechanism 14 and send the target rotational speed to the controller 22 after acquiring the target rotational speed.

Figure 8:
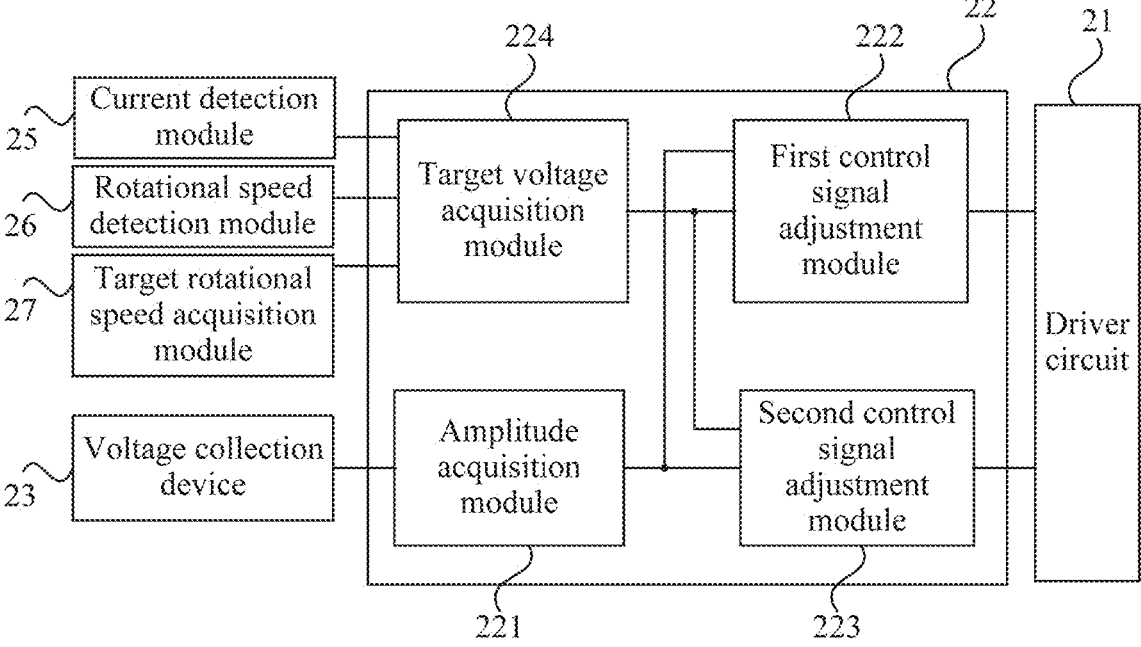
FIG. 8 is a schematic diagram of a system structure of a controller in FIG. 6.

In an example, FIG. 8 is a schematic diagram of a system structure of a controller in FIG. 6. As shown in FIG. 8, the controller 22 further includes a target voltage acquisition module 224 for acquiring the target voltage according to the sampled current, the real-time rotational speed, and the target rotational speed.

Specifically, the target voltage acquisition module 224 may be provided in the controller 22. The target voltage acquisition module 224 is connected to the current detection module 25, the rotational speed detection module 26, and the target rotational speed acquisition module 27 and can acquire in real time the target voltage according to the sampled current, the real-time rotational speed, and the target rotational speed in the field-oriented control (FOC) (vector control) method so that the first control signal adjustment module 222 can regulate the target voltage according to a voltage regulation signal.

Figure 9:
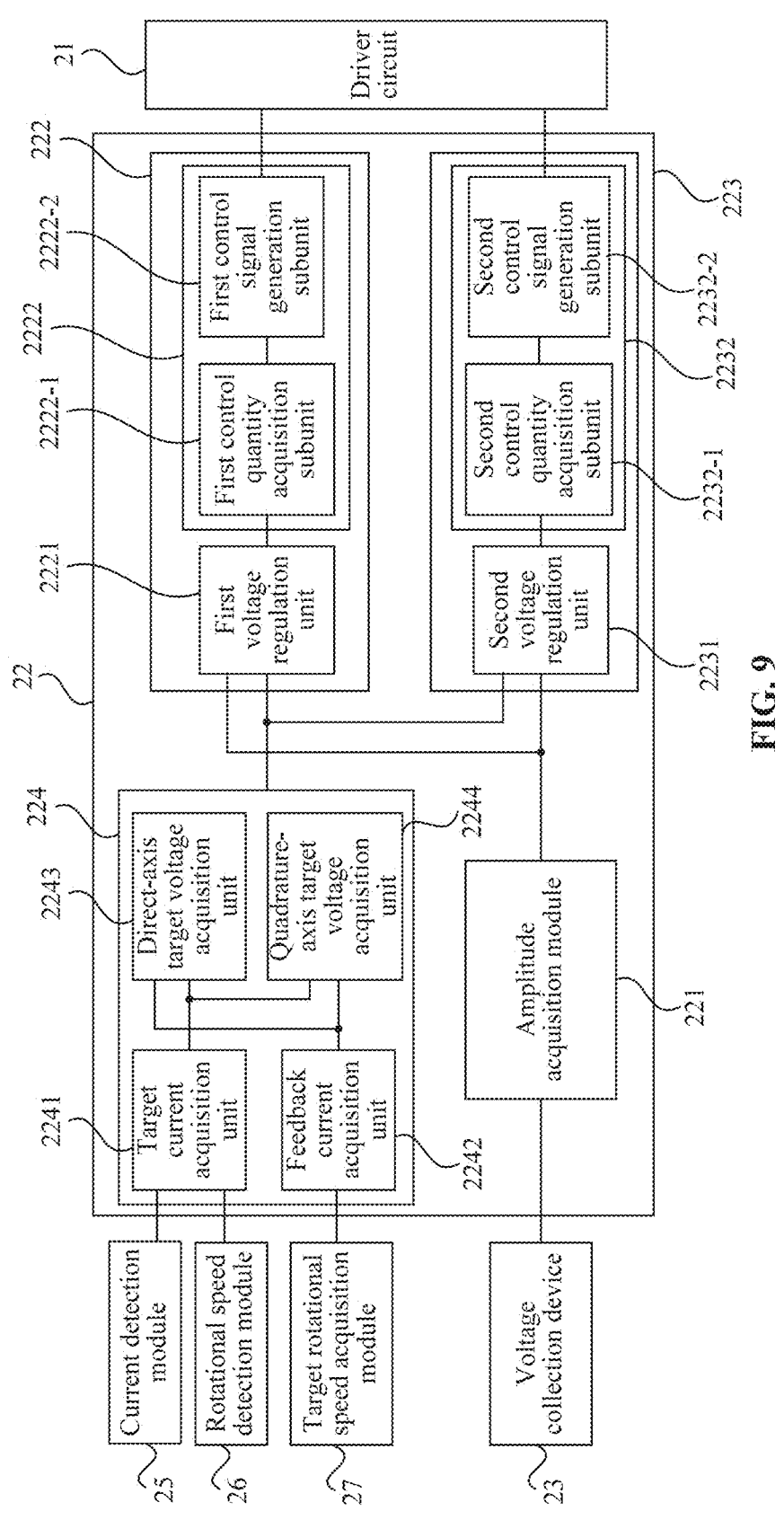
FIG. 9 is a schematic diagram of a system structure of another controller according to an example of the present application.

In an example, FIG. 9 is a schematic diagram of a system structure of another controller according to an example of the present application. As shown in FIG. 9, the target voltage acquisition module 224 includes a target current acquisition unit 2241 and a feedback current acquisition unit 2242; the target current acquisition unit 2241 is used for acquiring the real-time rotational speed and the target rotational speed of the electric motor and acquiring the direct-axis target current Id" and the quadrature-axis target current Iq" according to the target rotational speed and the real-time rotational speed; and the feedback current acquisition unit 2242 is used for acquiring the sampled current of the electric motor and acquiring the direct-axis feedback current Id0" and the quadrature-axis feedback current Iq0" according to the real-time rotational speed.

Specifically, the target current acquisition unit 2241 is connected to the rotational speed detection module 26 and the target rotational speed acquisition module 27, can determine the target current Is according to the real-time rotational speed of the electric motor 15 and the real-time rotational speed set by the user, and can further determine the direct-axis target current Id" and the quadrature-axis target current Iq" according to the target current Is. The target current Is, the direct-axis target current Id", and the quadrature-axis target current Iq" are vectors having directions and magnitudes, where the directions of the direct-axis target current Id" and the quadrature-axis target current Iq" are perpendicular to each other, and the target current Is is the resultant vector of the direct-axis target current Id" and the quadrature-axis target current Iq".

The feedback current acquisition unit 2242 is connected to the current detection module 25. After acquiring the three-phase currents Iu, Iv, and Iw in the actual operation of the electric motor 22, the current detection module 25 sends the detected three-phase currents Iu, Iv, and Iw to the feedback current acquisition unit 2242. The feedback current acquisition unit 2242 converts the three-phase currents Iu, Iv, and Iw into two-phase currents, which are the direct-axis feedback current Id0" and the quadrature-axis feedback current Iq0".

In an example, referring to FIG. 9, the target voltage acquisition module 224 includes a direct-axis target voltage acquisition unit 2243 for acquiring a direct-axis target voltage Ud" according to the direct-axis target current Id" and the direct-axis feedback current Id0"; and a quadrature-axis target voltage acquisition unit 2244 for acquiring a quadrature-axis target voltage Uq" according to the quadrature-axis target current Iq" and the quadrature-axis feedback current Iq0".

Specifically, the direct-axis target voltage acquisition unit 2243 is connected to the target current acquisition unit 2241 and the feedback current acquisition unit 2242, can acquire the direct-axis target current Id" provided by the target current acquisition unit 2241 and the direct-axis feedback current Id0" provided by the feedback current acquisition unit 2242, and can determine the direct-axis target voltage Ud" according to the direct-axis target current Id" and the direct-axis feedback current Id0". Similarly, the quadrature-axis target voltage acquisition unit 2244 is connected to the target current acquisition unit 2241 and the feedback current acquisition unit 2242, can acquire the quadrature-axis target current Iq" provided by the target current acquisition unit 2241 and the quadrature-axis feedback current Iq0" provided by the feedback current acquisition unit 2242, and can determine the quadrature-axis target voltage Uq" according to the quadrature-axis target current Iq" and the quadrature-axis feedback current Iq0". The target voltage Us is the resultant vector of the direct-axis target voltage Ud" and the quadrature-axis target voltage Uq". The amplitude of the target voltage Us can be adjusted by adjusting the direction and magnitude of the direct-axis target voltage Ud" and the quadrature-axis target voltage Uq".

In an example, with continued reference to FIG. 9, the first control signal generation unit 2222 includes a first control quantity acquisition subunit 2222-1 for acquiring the first voltage control quantity Uα1 and the second voltage control quantity Uβ1 according to the decreased target voltage Us; and a first control signal generation subunit 2222-2 for generating the control signal according to the first voltage control quantity Uα1 and the second voltage control quantity Uβ1.

Specifically, the first voltage control quantity Uα1 and the second voltage control quantity Uβ1 may be intermediate quantities between the direct-axis target voltage Ud", the quadrature-axis target voltage Uq", and the three-phase voltages Uu, Uv, and Uw loaded to the electric motor 15. The first control signal generation unit 2222 may determine the first voltage control quantity Uα1 and the second voltage control quantity Uβ1 according to the decreased target voltage Us (or the regulated direct-axis target voltage Ud" and the regulated quadrature-axis target voltage Uq") through the first control quantity acquisition subunit 2222-1 so that the first control signal generation subunit 2222-2 can further determine the duty cycle of each PWM signal according to the first voltage control quantity Uα1 and the second voltage control quantity Uβ1. In this manner, the duty cycle of the PWM signal is reduced so that according to the received bus voltage and PWM signal, the driver circuit 21 increases the three-phase voltages Uu, Uv, and Uw outputted and loaded to the three-phase windings of the electric motor 15, thereby controlling the electric motor to keep rotating at the target rotational speed. Uu, Uv, and Uw are three-phase symmetrical sine wave voltages or saddle wave voltages, and the three-phase voltages Uu, Uv, and Uw have a phase difference of 120° with each other.

In an example, with continued reference to FIG. 9, the second control signal generation unit 2232 includes a second control quantity acquisition subunit 2232-1 for acquiring a third voltage control quantity Uα2 and a fourth voltage control quantity Uβ2 according to the increased target voltage Us; and a second control signal generation subunit 2232-2 for generating the control signal according to the third voltage control quantity Uα2 and the fourth voltage control quantity Uβ2.

Specifically, the third voltage control quantity Uα2 and the fourth voltage control quantity Uβ2 are also intermediate quantities between the direct-axis target voltage Ud", the quadrature-axis target voltage Uq", and the three-phase voltages Uu, Uv, and Uw loaded to the electric motor 15. The second control signal generation unit 2232 may determine the third voltage control quantity Uα2 and the fourth voltage control quantity Uβ2 according to the increased target voltage Us (or the regulated direct-axis target voltage Ud" and the regulated quadrature-axis target voltage Uq") through the second control quantity acquisition subunit 2232-1 so that the second control signal generation subunit 2232-2 can further determine the duty cycle of each PWM signal according to the third voltage control quantity Uα2 and the fourth voltage control quantity Uβ2. In this manner, the duty cycle of the PWM signal is increased so that the drive current outputted by the driver circuit 21 is increased, thereby driving the electric motor 15 to output sufficient torque.

For example, in some examples, the PWM signal may be a seven-segment PWM signal or a five-segment PWM signal. Compared with the five-segment PWM signal, the seven-segment PWM signal has a symmetrical waveform and less harmonic content, but requires a higher switching frequency for controlling the electronic switches.

Based on the preceding content, the first control signal generation subunit 2222-2 and the second control signal generation subunit 2232-2 can further acquire the temperature of the electric motor. When the temperature of the electric motor is within a normal range, the first control signal generation subunit 2222-2 and the second control signal generation subunit 2232-2 generate a seven-segment PWM signal. When the temperature of the electric motor is greater than a temperature limit, the first control signal generation subunit 2222-2 and the second control signal generation subunit 2232-2 generate a five-segment PWM signal.

Alternatively, in another feasible example of the present application, the first control signal generation subunit 2222-2 and the second control signal generation subunit 2232-2 may acquire the harmonics of the three-phase voltages of the electric motor. When the amplitude of the harmonics of the electric motor 15 is greater than or equal to a first amplitude, the first control signal generation subunit 2222-2 and the second control signal generation subunit 2232-2 generate a seven-segment PWM signal. When the amplitude of the harmonics of the electric motor 15 is less than the first amplitude, the first control signal generation subunit 2222-2 and the second control signal generation subunit 2232-2 generate a five-segment PWM signal. The first amplitude may be set according to design requirements.

In an example, the controller 22 may control the electronic switches to be turned on or off at a preset frequency to output power to the phases of stator windings of the electric motor 15 and then adjust the currents loaded to the windings, thereby making the electric motor 15 rotate at a preset rotational speed. In this example, the preset frequency ranges from 5 kHz to 40 KHz. Optionally, the preset frequency ranges from 5 kHz to 20 kHz.

In this example, the controller 22 may determine the target voltage according to the target rotational speed and the real-time rotational speed of the electric motor set by the user and then determine, according to the target voltage, the duty cycle of the PWM control signal provided to each electronic switch in the driver circuit 21 so that the driver circuit 21 outputs the drive current to the electric motor 15 according to the PWM control signal with the duty cycle, thereby making the real-time rotational speed of the electric motor 15 infinitely approach the target rotational speed. Usually, when the real-time rotational speed of the electric motor 15 is greater than the target rotational speed, the controller 22 controls the amplitude of the target voltage to decrease so that the duty cycle of the PWM control signal can be reduced, and the drive current outputted by the driver circuit 21 can be reduced, thereby making the rotational speed of the electric motor 15 to decrease to approach the target rotational speed. When the real-time rotational speed of the electric motor 15 is less than the target rotational speed, the controller 22 controls the amplitude of the target voltage to increase so that the duty cycle of the PWM control signal can be increased, and the drive current outputted by the driver circuit 21 can be increased, thereby making the rotational speed of the electric motor 15 to increase to approach the target rotational speed.

Figure 10:
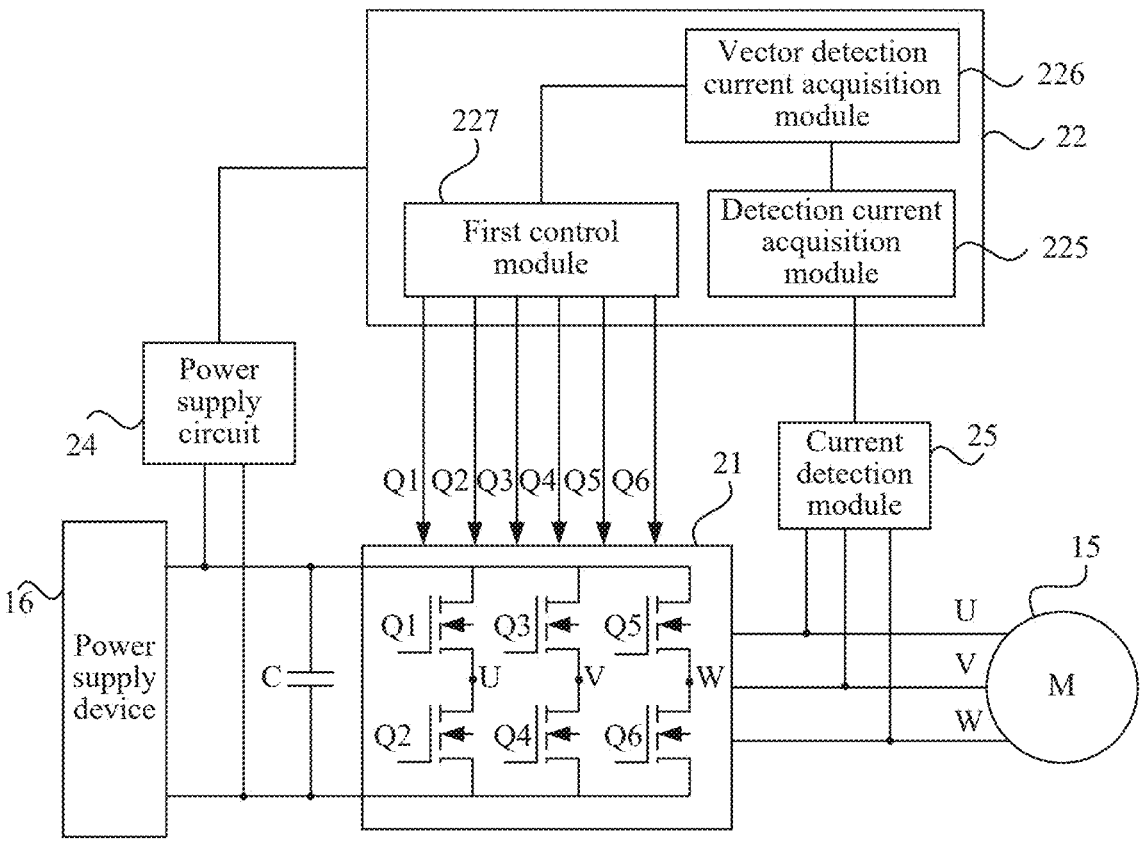
FIG. 10 is a structural diagram of the circuitry of a power tool according to an example of the present application.

As shown in FIG. 10, a detection current acquisition module 225, a vector detection current acquisition module 226, and a first control module 227 may be provided in the controller 22. The detection current acquisition module 225 may be connected to the current detection module 25 to acquire the detection currents provided by the current detection module 25, that is, the three-phase currents Iu, Iv, and Iw of the electric motor. The vector detection current acquisition module 226 may convert the three-phase currents Iu, Iv, and Iw of the electric motor into two-phase vector currents, which are the actual torque current Iq0 and the actual excitation current Id0. Before outputting the PWM control signal in the current control cycle, the first control module 227 can first determine whether the actual torque current Iq0 in the previous control cycle is greater than a first current threshold and/or whether the actual excitation current Id0 in the previous control cycle is greater than a second current threshold. If at least one of the preceding conditions is satisfied, it means that the electric motor 15 has a risk of burning out due to overcurrent. In this case, the output of the PWM control signal may be stopped in the current control cycle, or the PWM control signal for controlling the electronic switches in the driver circuit 21 to be turned off simultaneously is outputted so that the driver circuit stops outputting power to the electric motor 15 in time, thereby effectively avoiding the overcurrent risk of the electric motor 15. Alternatively, it is to be understood that, during the process of outputting the PWM control signal in the current control cycle, the first control module 227 simultaneously determines whether the actual torque current Iq0 in the current control cycle is greater than the first current threshold and/or whether the actual excitation current Id0 in the current control cycle is greater than the second current threshold. If at least one of the preceding conditions is satisfied, it means that the electric motor 15 has a risk of burning out due to overcurrent. In this case, the output of the PWM control signal may be stopped in the next control cycle, or the PWM control signal for controlling the electronic switches in the driver circuit 21 to be turned off simultaneously is outputted.

When the actual torque current Iq0 in the previous control cycle does not exceed the first current threshold and the actual excitation current Id0 in the previous control cycle does not exceed the second current threshold, the actions of the electronic switches in the driver circuit 21 are controlled according to the target voltage. Usually, in normal operation, the electronic switches are operated in groups, that is, the electronic switches are controlled to be turned on and off in groups. In this case, the first electronic switch Q1 and the fourth electronic switch Q4 may form a group, the third electronic switch Q3 and the sixth electronic switch Q6 may form a group, and the fifth electronic switch Q5 and the second electronic switch Q2 may form a group. In each control cycle, the electronic switches in groups are turned on or off in sequence, thereby outputting the three-phase alternating current voltages.

The first control module may control the electronic switches to be turned off simultaneously in the current control cycle when the actual torque current and/or the actual excitation current in the previous control cycle is too large, thereby preventing the electric motor from burning out due to overcurrent. When determining that the electric motor is in a normal operating state, the first control module controls the electronic switches to be turned on and off in groups in the original manner to ensure that the electric motor is driven properly and the power tool operates normally.

With continued reference to FIG. 10, the first control module 227 is further used for controlling the electronic switches to be turned on in groups in the next control cycle after the current control cycle ends.

When the values of the actual excitation current Id0 and the actual torque current Iq0 in the previous control cycle are within normal ranges, the drive voltage may be outputted normally to the electric motor 15. In this case, the groups of electronic switches are turned off in sequence in the current control cycle and turned on in sequence in the next control cycle, thereby outputting the three-phase alternating current voltages. In addition, after controlling the groups of electronic switches to be turned off simultaneously in a certain control cycle, the first control module 227 may control the groups of electronic switches to be turned on in groups in sequence according to the target voltage in the next control cycle so that the driver circuit 21 outputs the drive signal to the electric motor 15 again, that is, the electric motor 15 resumes rotation, which is convenient for the user to use, thereby preventing the electric motor from stopping rotating for a long time and affecting the experience of the user using the power tool.

With continued reference to FIG. 10, the first control module 227 is further used for, after controlling the multiple electronic switches to be turned off simultaneously in the current control cycle, when determining that the actual torque current Iq0 in the current control cycle does not exceed the first current threshold and the actual excitation current Id0 in the current control cycle does not exceed the second current threshold, controlling the multiple electronic switches to be turned on in groups in the next control cycle.

After controlling the electronic switches to be turned off simultaneously in the current control cycle according to the actual torque current Iq0 and the actual excitation current Id0 in the previous control cycle, the first control module 227 may continue determining whether the actual torque current Iq0 and the actual excitation current Id0 in the current control cycle still pose an overcurrent risk. If the actual torque current Iq0 and the actual excitation current Id0 are both within threshold ranges, the first control module 227 controls the electronic switches to be turned on in groups in sequence in the next control cycle to resume driving the electric motor 15. If the actual torque current Iq0 and the actual excitation current Id0 in the current control cycle still pose an overcurrent risk, the overcurrent risk in the next cycle continues being determined until it is determined that the actual torque current Iq0 and the actual excitation current Id0 are both within the threshold ranges in the n-th cycle. Then, in the (n+1)-th control cycle, the electronic switches are controlled to be turned on in groups in sequence. In this manner, it can be ensured that the electric motor operates in a safe state, that is, it can be ensured that the electric motor keeps operating normally after resuming rotation. N denotes a natural number.

Figures 11, 12:
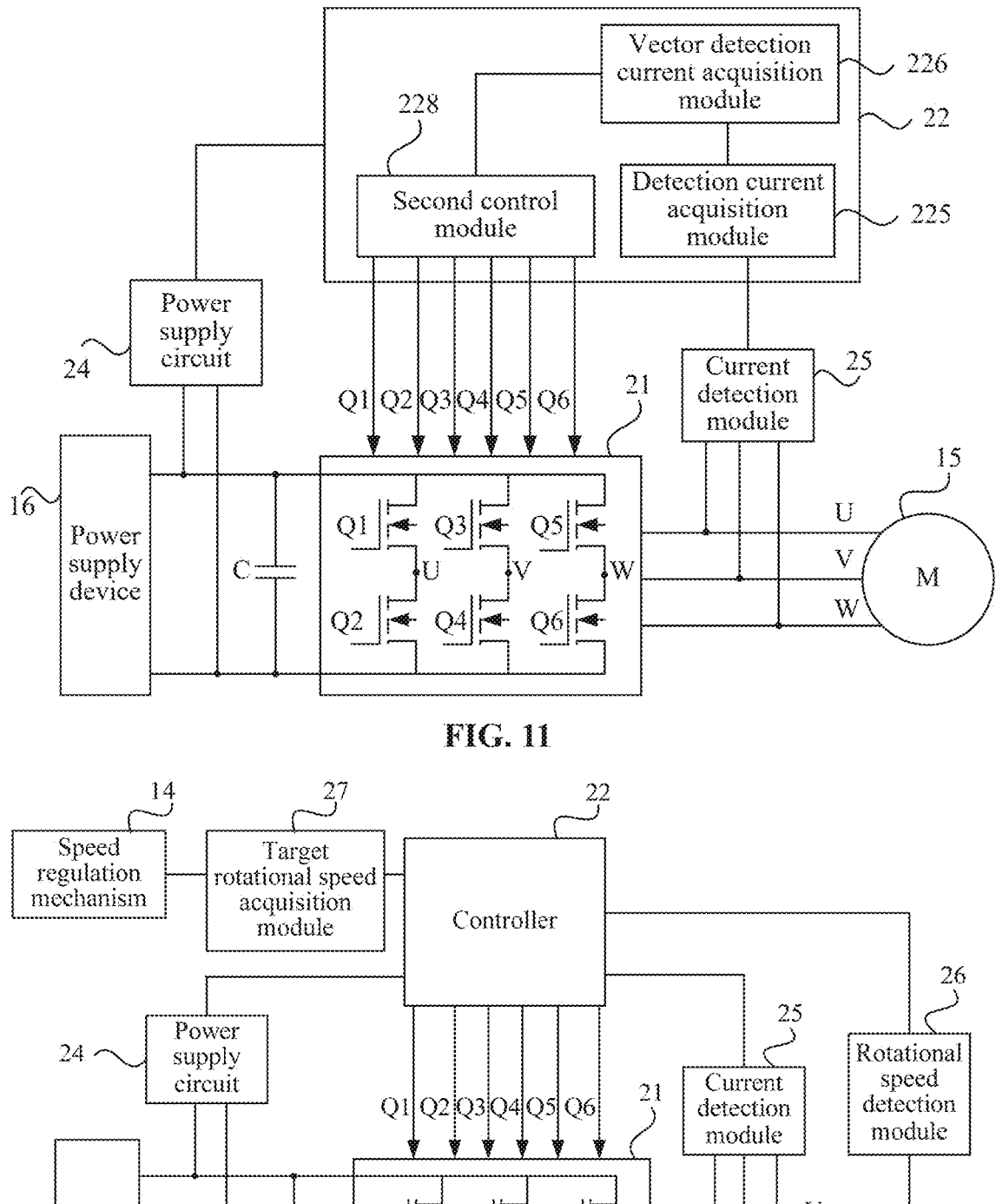
FIG. 11 is a structural diagram of the circuitry of another power tool according to an example of the present application.
FIG. 12 is a structural diagram of the circuitry of another power tool according to an example of the present application.

In an example, as shown in FIG. 11, the controller 22 includes a second control module 228. During the process of outputting the PWM control signal in the current control cycle, the second control module 228 simultaneously determines whether the actual torque current Iq0 in the current control cycle is greater than the first current threshold and/or whether the actual excitation current Id0 in the current control cycle is greater than the second current threshold. If at least one of the preceding conditions is satisfied, it means that the electric motor 15 has a risk of burning out due to overcurrent. In this case, the output of the PWM control signal may be stopped during the remaining time in the current control cycle, or the PWM control signal for controlling the electronic switches in the driver circuit 21 to be turned off simultaneously is outputted so that the driver circuit 21 can be controlled to stop outputting power to the electric motor 15 in a shorter time, thereby further protecting the electric motor 15.

For example, when the actual torque current Iq0 in the current control cycle does not exceed the first current threshold and the actual excitation current Id0 in the current control cycle does not exceed the second current threshold, the electronic switches in the driver circuit 21 are controlled according to the target voltage, thereby outputting the three-phase alternating current voltages.

In this example, the controller acquires the detection current through the detection current acquisition module and acquires the actual torque current and the actual excitation current of the electric motor according to the detection current so that the second control module can control the electronic switches to be turned off simultaneously during the remaining time in the current control cycle when the actual torque current and/or the actual excitation current in the current control cycle are too large so that the driver circuit can be controlled to stop outputting power to the electric motor in a shorter time, thereby further protecting the electric motor.

In an example, the second control module 228 is further used for controlling the electronic switches to be turned on in groups in the next control cycle after the current control cycle ends.

When the values of the actual excitation current Id0 and the actual torque current Iq0 in the previous control cycle are within normal ranges, the drive voltage may be outputted normally to the electric motor 15. In this case, the groups of electronic switches are turned off in sequence in the current control cycle and turned on in sequence in the next control cycle, thereby outputting the three-phase alternating current voltages. In addition, after controlling the groups of electronic switches to be turned off in groups or simultaneously in a certain control cycle, the second control module 228 may control the groups of electronic switches to be turned on in groups in sequence in the next control cycle so that the driver circuit 21 outputs the drive signal to the electric motor 15 again, that is, the electric motor 15 resumes rotation, which is convenient for the user to use, thereby preventing the electric motor from stopping rotating for a long time and affecting the experience of the user using the power tool.

In an example, the second control module 228 is further used for, after controlling the multiple electronic switches to be turned off simultaneously in the current control cycle, when determining that the actual torque current in the next control cycle does not exceed the first current threshold and the actual excitation current in the next control cycle does not exceed the second current threshold, controlling the multiple electronic switches to be turned on in groups in the next control cycle.

After controlling, in the current control cycle, the electronic switches to be turned off simultaneously according to the actual torque current Iq0 and the actual excitation current Id0 in the current control cycle (for example, the m-th control cycle), in the next control cycle (that is, the (m+1)-th control cycle), the second control module 228 may continue determining whether the actual torque current Iq0 and the actual excitation current Id0 in the next control cycle (the (m+1)-th control cycle) still pose an overcurrent risk. If the actual torque current Iq0 and the actual excitation current Id0 are both within the threshold ranges, then the second control module 228 controls the electronic switches to be turned on in groups in sequence in the next control cycle (the (m+1)-th control cycle) to resume driving the electric motor 15. If the actual torque current Iq0 and the actual excitation current Id0 in the (m+1)-th control cycle still pose an overcurrent risk, the overcurrent risk in the (m+2)-th control cycle continues being determined until it is determined that the actual torque current Iq0 and the actual excitation current Id0 are both within the threshold ranges in the (m+i)-th cycle. Then, in the (m+i)-th control cycle, the electronic switches are controlled to be turned on in groups in sequence. In this manner, it can be ensured that the electric motor operates in a safe state, that is, it can be ensured that the electric motor keeps operating normally after resuming rotation. In this manner, it can be ensured that the rotational speed of the electric motor does not decrease and the power tool can be used continuously, which is conducive to improving the experience of the user using a capacitor tool. m and i both denote natural numbers, and i≥3.

In an example, FIG. 12 is a structural diagram of the circuitry of another power tool according to an example of the present application. Referring to FIG. 12, the power tool further includes a rotational speed detection module 26 and a target rotational speed acquisition module 27; the rotational speed detection module 26 is used for acquiring the real-time rotational speed of the electric motor and sending the real-time rotational speed to the controller 22; and the target rotational speed acquisition module 27 is used for acquiring the target rotational speed of the electric motor and sending the target rotational speed to the controller 22.

Figure 13:
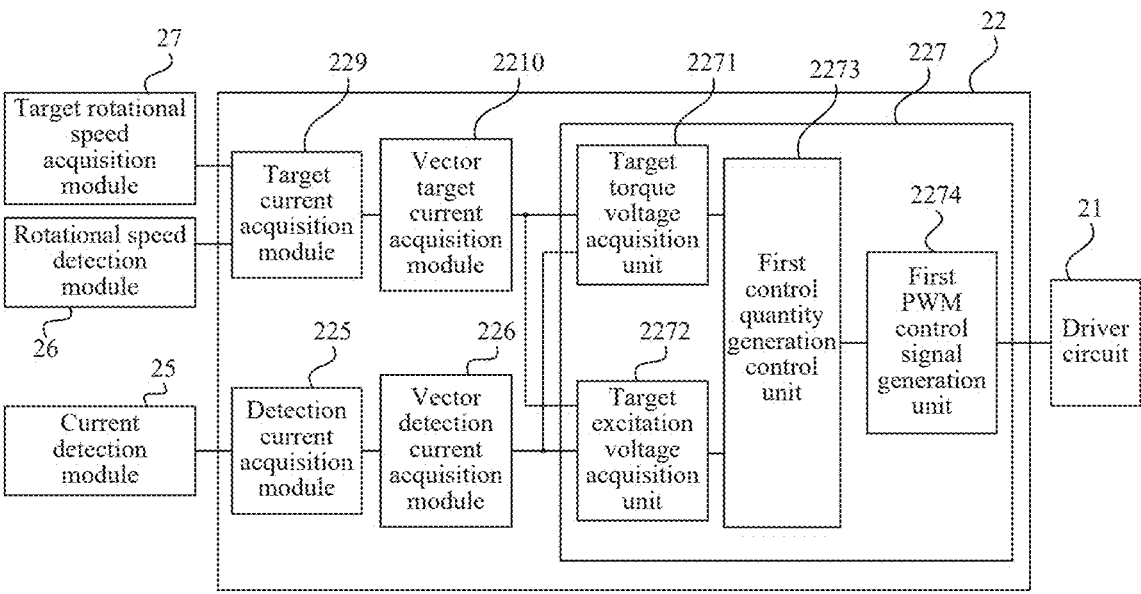
FIG. 13 is a schematic diagram of a system structure of a controller in FIG. 12.
Figure 14:
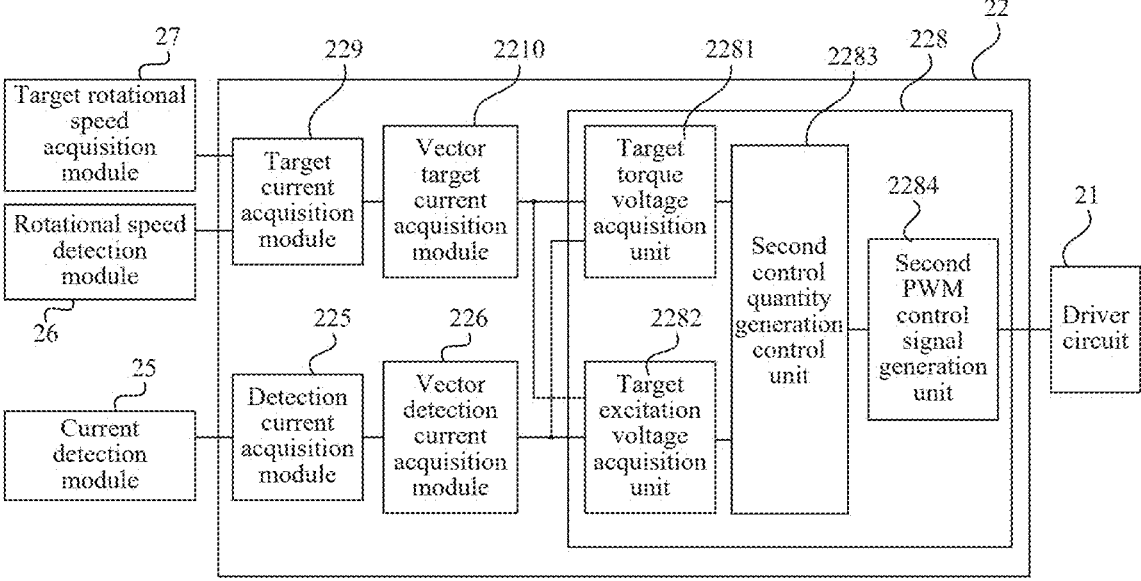
FIG. 14 is a schematic diagram of another system structure of a controller in FIG. 12.

FIG. 13 is a schematic diagram of a system structure of a controller in FIG. 12, and FIG. 14 is a schematic diagram of another system structure of a controller in FIG. 12. Referring to FIG. 13 or 14, the controller 22 further includes a target current acquisition module 229 for acquiring the real-time rotational speed and the target rotational speed of the electric motor and determining the target current according to the target rotational speed; and a vector target current acquisition module 2210 for acquiring the target torque current and the target excitation current according to the target current.

The target current acquisition module 229 is connected to the rotational speed detection module 26 and the target rotational speed acquisition module 27 and can determine the target current Is according to the real-time rotational speed of the electric motor 15 and the real-time rotational speed set by the user. The vector target current acquisition module 2210 is connected to the target current acquisition module 229 and the control module in the controller 22 and can further determine the target torque current Iq and the target excitation current Id according to the target current Is. The target current Is, the target torque current Iq, and the target excitation current Id are all vectors having directions and magnitudes. The directions of the target torque current Iq and the target excitation current Id are perpendicular to each other, and the target current Is is the resultant vector of the target torque current Iq and the target excitation current Id so that the first control module 227 or the second control module 228 can output the PWM control signal according to the target torque current Iq, the target excitation current Id, the actual torque current Iq0, and the actual excitation current Id0.

Referring to FIG. 13, the first control module 227 includes a target torque voltage acquisition unit 2271 for acquiring the target torque voltage Uq according to the target torque current Iq and the actual torque current Iq0 in the current control cycle; a target excitation voltage acquisition unit 2272 for acquiring the target excitation voltage Uq according to the target excitation current Id and the actual excitation current Id0 in the current control cycle; a first control quantity generation control unit 2273 for generating the first voltage control quantity Uα1 and the second voltage control quantity Uβ1 according to the actual torque current Iq0 and the actual excitation current Id0 in the previous control cycle and the target torque voltage Uq and the target excitation voltage Uq in the current control cycle; and a first PWM control signal generation unit 2274 for outputting the PWM control signal according to the first voltage control quantity Uα1 and the second voltage control quantity Uβ1.

The target torque voltage acquisition unit 2271 is connected to the vector target current acquisition module 2210 and the vector detection current acquisition module 226 and can acquire the target torque current Iq(n) in the current control cycle provided by the vector target current acquisition module 2210 and the actual torque current Iq0($n$) in the current control cycle provided by the vector detection current acquisition module 226 and determine the target torque voltage Uq(n) in the current control cycle according to the target torque current Iq(n) and the actual torque current Iq0($n$). Similarly, the target excitation voltage acquisition unit 2272 is connected to the vector target current acquisition module 2210 and the vector detection current acquisition module 226 and can acquire the target excitation current Id(n) in the current control cycle provided by the vector target current acquisition module 2210 and the actual excitation current Id0($n$) in the current control cycle provided by the vector detection current acquisition module 226 and determine the target excitation voltage Uq(n) in the current control cycle according to the target excitation current Id(n) and the actual excitation current Id0($n$). The target voltage Us(n) is the resultant vector of the target torque voltage Uq(n) and the target excitation voltage Uq(n). The amplitude of the target voltage Us(n) may be adjusted by adjusting the directions and magnitudes of the target torque voltage Uq(n) and the target excitation voltage Uq(n), thereby adjusting the duty cycle of the PWM control signal. The first control quantity generation control unit 2273 may determine whether the electric motor 15 has an overcurrent risk according to the actual torque current Iq0($n$–1) and the actual excitation current Id0($n$–1) in the previous control cycle. If the electric motor 15 has an overcurrent risk, the output of the voltage control quantity is stopped in the current control cycle (that is, the n-th control cycle) so that the first PWM control signal generation unit 2334 stops outputting the PWM control signal or generates the voltage control quantity that causes the PWM control signals to output invalid levels simultaneously. In this manner, the first PWM control signal generation unit 2334 outputs the PWM control signal that can control the electronic switches to be turned off simultaneously. If it is determined that the electric motor 15 does not have an overcurrent risk according to the actual torque current Iq0($n$–1) and the actual excitation current Id0($n$–1) in the previous control cycle, the first control quantity generation control unit 2273 generates the first voltage control quantity Uα1 and the second voltage control quantity Uβ1 according to the target torque voltage Uq(n) and the target excitation voltage Uq(n) in the current control cycle (that is, the n-th control cycle) so that the first PWM control signal generation unit 2334 can output the PWM control signal according to the first voltage control quantity Uα1 and the second voltage control quantity Uβ1 to control the electronic switches to be turned on or off in groups, thereby outputting power to the electric motor 15 to drive the electric motor 15.

Referring to FIG. 14, the second control module 228 includes a target torque voltage acquisition unit 2281 for acquiring the target torque voltage according to the target torque current and the actual torque current in the current control cycle; a target excitation voltage acquisition unit 2282 for acquiring the target excitation voltage according to the target excitation current and the actual excitation current in the current control cycle; a second control quantity generation control unit 2283 for generating the third voltage control quantity and the fourth voltage control quantity according to the actual torque current, the actual excitation current, the target torque voltage, and the target excitation voltage in the current control cycle; and a second PWM control signal generation unit 2284 for outputting the PWM control signal according to the third voltage control quantity and the fourth voltage control quantity.

Different from the example shown in FIG. 13, the second control quantity generation control unit 2283 in the second control module 228 in FIG. 14 detects whether the electric motor 15 has an overcurrent risk according to the actual torque current Iq0($n$) and the actual excitation current Id0($n$) in the current control cycle and when determining that an overcurrent risk exists, stops generating the voltage control quantity during the remaining time in the current control cycle (that is, the n-th control cycle) so that the second PWM control signal generation unit 2284 stops outputting the PWM control signal or generates the voltage control quantity that causes the PWM control signals to output invalid levels simultaneously. In this manner, the second PWM control signal generation unit 2284 can output the PWM control signal that can control the electronic switches to be turned off simultaneously. If it is determined that the electric motor 15 does not have an overcurrent risk according to the actual torque current Iq0($n$) and the actual excitation current Id0($n$) in the current control cycle, the second control quantity generation control unit 2283 generates the third voltage control quantity Uα2 and the fourth voltage control quantity Uβ2 according to the target torque voltage Uq(n) and the target excitation voltage Uq(n) in the current control cycle (that is, the n-th control cycle) so that the second PWM control signal generation unit 2284 can output the PWM control signal according to the third voltage control quantity Uα2 and the fourth voltage control quantity Uβ2 to control the electronic switches to be turned on or off in groups, thereby outputting power to the electric motor 15 to drive the electric motor 15.

An example of the present application provides a control method for a power tool so that the output power of the electric motor can be increased by increasing the torque of the electric motor when the power supply voltage is low. The control method for a power tool may be performed by a control device for a power tool provided by the example of the present application. The control device for a power tool may be implemented in the form of software and/or hardware and may be configured in the controller of the power tool.

Figure 15:
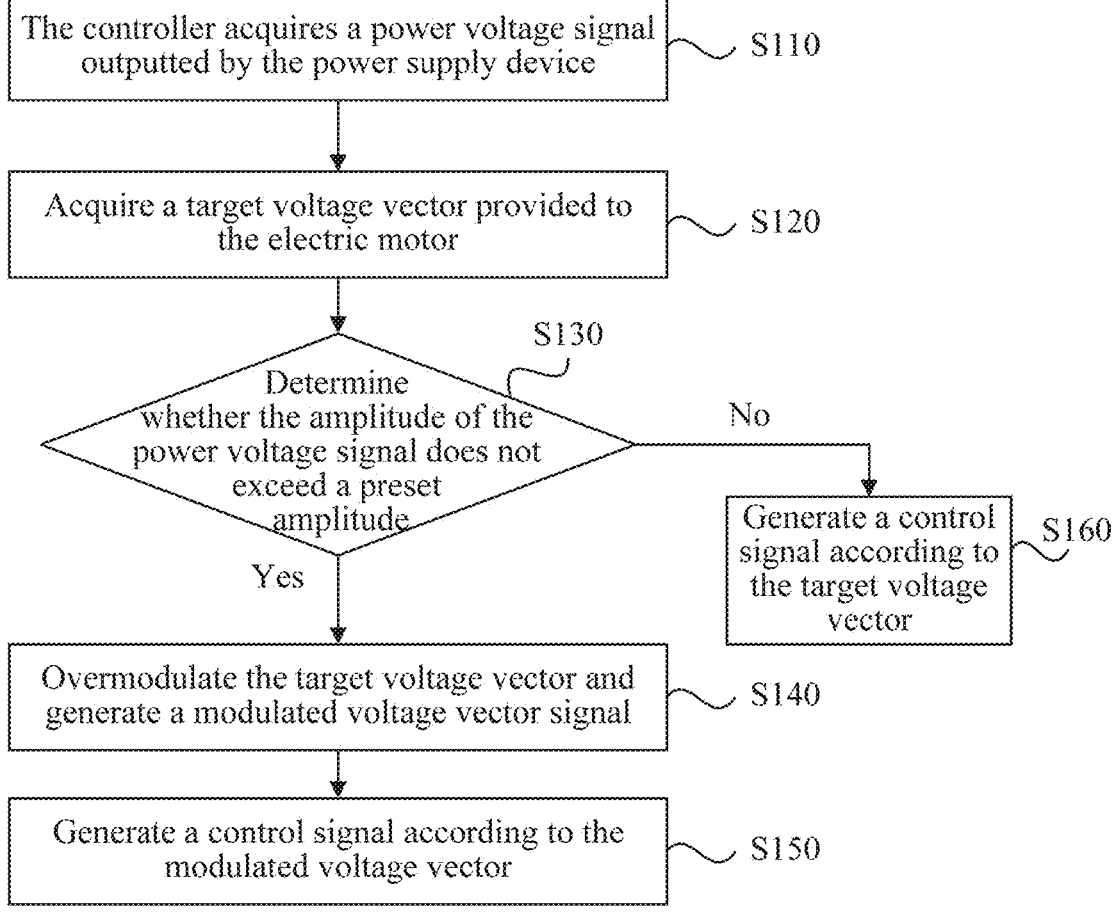
FIG. 15 is a flowchart of a control method for a power tool according to example one of the present application.

FIG. 15 is a flowchart of a control method for a power tool according to example one of the present application. Referring to FIG. 15, the control method for a power tool includes the steps below.

In S110, the controller acquires a power voltage signal outputted by the power supply device.

Referring to the structure of the power tool in the preceding example, the power voltage signal acquired by the controller 22 is the power voltage signal outputted by the power supply device 16 to the driver circuit 21. The controller 22 may be coupled to the power supply device 16 to acquire the power voltage signal outputted by the power supply device 16 through an A/D port.

In S120, a target voltage vector provided to the electric motor is acquired.

Specifically, the target voltage vector of the electric motor may be determined based on the target rotational speed set by the user, the actual rotational speed of the electric motor, and the detected current (for example, the actual phase current when the electric motor is operating). The target voltage vector may include the target excitation current Id and the target torque current Iq, the target excitation current Id is related to the stator magnetic field strength, and the target torque current Iq is related to the electric motor torque.

In S130, whether the amplitude of the power voltage signal does not exceed a preset amplitude is determined. If so, step S140 is performed; if not, step S160 is performed.

Specifically, the preset amplitude may be a boundary value between a normal power supply voltage and a low power supply voltage of the power voltage signal, and the specific value may be set according to design requirements. When the amplitude of the power voltage signal does not exceed the preset amplitude, that is, when the amplitude of the power voltage signal is less than or equal to the preset amplitude, it can be determined that the amplitude of the power voltage signal outputted by the power supply device 16 is too low, causing the output power of the electric motor 15 to be too low. In this case, the electric motor cannot output sufficient torque to drive the functional piece 12 to work, affecting the use of the power tool.

In S140, the target voltage vector is overmodulated and a modulated voltage vector signal is generated.

Specifically, since the output power of the electric motor is the product of the torque and the rotational speed, based on this, when it is determined that the amplitude of the power voltage signal is too low, the target voltage vector may be overmodulated to increase the torque of the electric motor, thereby increasing the output power of the electric motor.

For example, the target voltage vector is converted into the modulated voltage vector after overmodulation, and the control signal is generated according to the modulated voltage vector so that when the driver circuit 21 drives the electric motor according to the control signal, the torque of the electric motor can be increased, thereby increasing the output power of the electric motor. In this manner, the electric motor can output sufficient torque to drive the functional piece 12 to work, thereby ensuring the normal use of the power tool. The control signal may be the PWM signal.

Specifically, the target voltage vector is overmodulated, that is, the target excitation voltage Ud and the target torque voltage Uq are overmodulated to generate corresponding modulated voltage vectors, that is, the modulated excitation voltage Ud' and the modulated torque voltage Uq'.

In S150, a control signal is generated according to the modulated voltage vector.

Specifically, when the control signal is generated according to the modulated voltage vector, the modulated excitation voltage Ud' and the modulated torque voltage Uq' may be converted from two-phase direct current signals to two-phase alternating current signals. Specifically, the modulated excitation voltage Ud' and the modulated torque voltage Uq' may be converted into two-phase modulated alternating current voltages Ua' and Ub' through inverse Park transform. Then, the two-phase modulated alternating current voltages Ua' and Ub' are converted into three-phase modulated alternating current voltages Ua', Ub', and Uc' so that the control signal (that is, the PWM signal) can be generated according to the three-phase modulated alternating current voltages Ua', Ub', and Uc'.

In S160, a control signal is generated according to the target voltage vector.

Specifically, when it is determined that the amplitude of the power voltage signal is greater than the preset amplitude, it means that the power voltage signal outputted by the power supply device 16 is within a normal range. In this case, the target voltage vector may not be overmodulated, and the control signal may be generated directly according to the target voltage vector.

For example, based on the same principle, the target excitation voltage Ud and the target torque voltage Uq may be converted from two-phase direct current signals to two-phase alternating current signals. Specifically, the target excitation voltage Ud and the target torque voltage Uq may be converted into two-phase target alternating current voltages Ua and Ub through inverse Park transform. Then, the two-phase target alternating current voltages Ua and Ub are converted into three-phase target alternating current voltages Ua, Ub, and Uc so that the control signal (that is, the PWM signal) can be generated according to the three-phase target alternating current voltages Ua, Ub, and Uc.

Figure 16:
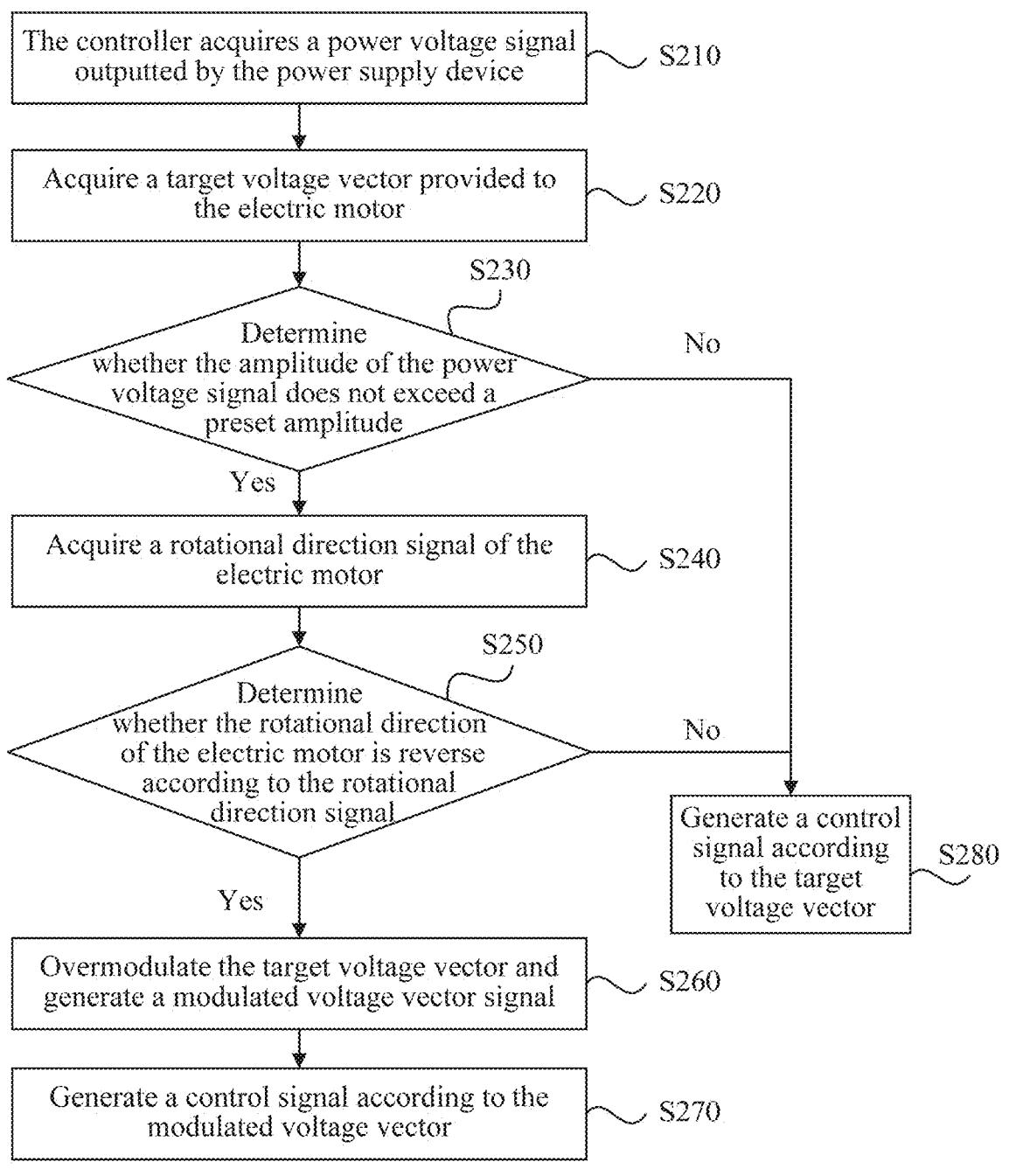
FIG. 16 is a flowchart of a control method for a power tool according to example two of the present application.

In the control method for a power tool provided in the example of the present application, the target voltage vector provided to the electric motor is overmodulated when the amplitude of the power voltage signal is too low so that the target voltage vector becomes the modulated voltage vector after modulation, and the control signal is generated according to the modulated voltage vector so that when the driver circuit drives the electric motor according to the control signal, the torque of the electric motor can be increased, thereby increasing the output power of the electric motor, ensuring that the output power of the electric motor is not reduced due to too low a power supply voltage, and ensuring the normal use of the power tool at a low power supply voltage. FIG. 16 illustrates another control method for a power tool according to an example of the present application. The control method for a power tool includes the steps below.

In S210, the controller acquires a power voltage signal outputted by the power supply device.

In S220, a target voltage vector provided to the electric motor is acquired.

In S230, whether the amplitude of the power voltage signal does not exceed a preset amplitude is determined. If so, step S240 is performed; if not, step S280 is performed. In S240, a rotational direction signal of the electric motor is acquired.

In S250, whether the rotational direction of the electric motor is reverse is determined according to the rotational direction signal. If so, step S260 is performed; if not, step S280 is performed.

In S260, the target voltage vector is overmodulated and a modulated voltage vector signal is generated.

Specifically, the power tool is often used in some working conditions that require a larger reverse torque, for example, removing screws. Therefore, when it is determined that the power voltage signal outputted by the power supply device is too low, the rotational direction of the electric motor may be determined. When it is determined that the rotational direction of the electric motor is reverse, it means that the electric motor requires a larger torque but not a larger rotational speed. In this case, the target voltage vector may be overmodulated to increase the electric motor torque so that the electric motor can satisfy the reverse operating conditions.

In S270, a control signal is generated according to the modulated voltage vector.

In S280, a control signal is generated according to the target voltage vector.

Figure 17:
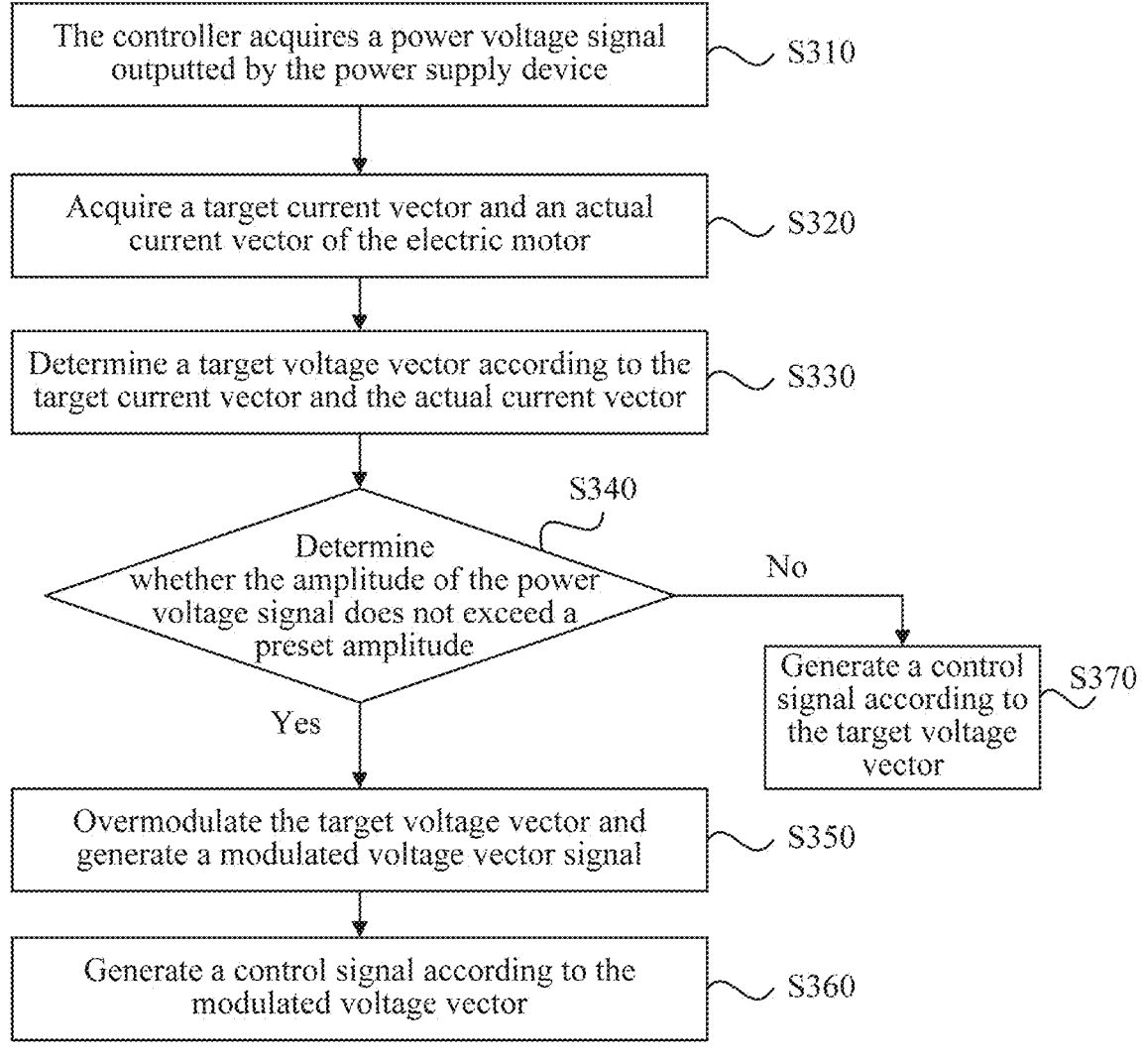
FIG. 17 is a flowchart of a control method for a power tool according to example three of the present application.

FIG. 17 illustrates another control method for a power tool according to an example of the present application. The control method for a power tool includes the steps below.

In S310, the controller acquires a power voltage signal outputted by the power supply device.

In S320, a target current vector and an actual current vector of the electric motor are acquired.

Specifically, the target current vector includes the target excitation current and the target torque current; and the actual current vector includes the actual excitation current and the actual torque current.

For example, when the target current vector of the electric motor is acquired, the real-time rotational speed and the target rotational speed of the electric motor may be acquired, the target current Is is determined according to the real-time rotational speed and the target rotational speed, and then the target excitation current Id and the target torque current Iq are determined according to the target current Is.

Specifically, the rotational speed detection module for detecting the real-time rotational speed of the electric motor may be provided in the power tool. For example, a Hall sensor is provided and can directly detect the speed and position of the rotor of the electric motor 15. The user may set the target rotational speed of the electric motor through the speed regulation mechanism 14 and send the target rotational speed to the controller. The target current Is, the target excitation current Id, and the target torque current Iq are the vectors having directions and magnitudes, where the directions of the target excitation current Id and the target torque current Iq are perpendicular to each other, and the target current Is is the resultant vector of the target excitation current Id and the target torque current Iq.

For example, when the actual current vector of the electric motor is acquired, the detection current of the electric motor may be acquired, and then the actual excitation current Id0 and the actual torque current Iq0 may be determined according to the detection current.

Specifically, the detection current may be the phase current of the electric motor. The current detection module for detecting the detection current of the electric motor may be provided in the power tool. For example, a Hall sensor may be provided to directly detect the phase current of each phase winding of the electric motor 15, or a detection resistor may be provided to detect the phase current of each phase winding of the electric motor 15. After acquiring the three-phase currents Iu, Iv, and Iw in the actual operation of the electric motor, the current detection module sends the detected three-phase currents Iu, Iv, and Iw to the controller. The controller can convert the three-phase currents Iu, Iv, and Iw into two-phase direct currents, that is, the actual excitation current Id0 and the actual torque current Iq0.

In S330, a target voltage vector is determined according to the target current vector and the actual current vector.

Specifically, the actual current vector (that is, the actual excitation current Id0 and the actual torque current Iq0) is used as a feedback signal and compared with the target current vector (that is, the target excitation current Id and the target torque current Iq) to determine the target voltage vector Us.

For example, the target excitation voltage is determined according to the target excitation current Id and the actual excitation current Id0, and the target torque voltage is determined according to the target torque current Iq and the actual torque current Iq0.

Specifically, the target excitation current Id and the actual excitation current Id0 may be compared and adjusted through proportional-integral (PI) regulation to generate the target excitation voltage Ud. The target excitation voltage Ud can make the actual excitation current Id0 of the electric motor reach the target excitation current Id as quickly and stably as possible.

Similarly, the target torque current Iq and the actual torque current Iq0 may be compared and adjusted through PI regulation to generate the target torque voltage Uq. The target torque voltage Uq can make the actual torque current Iq0 of the electric motor reach the target torque current Iq as quickly and stably as possible, and the target torque current Iq can control the electric motor torque to reach the target rotational speed as quickly and stably as possible.

In S340, whether the amplitude of the power voltage signal does not exceed a preset amplitude is determined. If so, step S350 is performed; if not, step S370 is performed.

In S350, the target voltage vector is overmodulated and a modulated voltage vector signal is generated.

In S360, a control signal is generated according to the modulated voltage vector.

In S370, a control signal is generated according to the target voltage vector.

FIG. 18 illustrates another control method for a power tool according to an example of the present application. The control method for a power tool includes the steps below.

In S410, the controller acquires a power voltage signal outputted by the power supply device.

In S420, a target current vector and an actual current vector of the electric motor are acquired.

The target current vector includes the target excitation current and the target torque current; and the actual current vector includes the actual excitation current and the actual torque current.

Specifically, the principle is the same as that in the preceding example. When the target current vector of the electric motor is acquired, the real-time rotational speed and the target rotational speed of the electric motor may be acquired, the target current Is is determined according to the real-time rotational speed and the target rotational speed, and then the target excitation current Id and the target torque current Iq are determined according to the target current Is.

When the actual current vector of the electric motor is acquired, the detection current of the electric motor may be acquired, and then the actual excitation current Id0 and the actual torque current Iq0 may be determined according to the detection current.

In S430, whether the amplitude of the power voltage signal does not exceed a preset amplitude is determined. If so, step S440 is performed; if not, step S460 is performed.

In S440, the target excitation current is configured to be less than 0.

Specifically, since the output power of the electric motor is the product of the torque and the rotational speed, based on this, when it is determined that the amplitude of the power voltage signal is too low, flux-weakening modulation may be adopted to increase the rotational speed of the electric motor to increase the output power of the electric motor.

For example, since the target excitation current Id is related to the stator magnetic field, when it is determined that the amplitude of the power voltage signal is less than or equal to the preset amplitude, the target excitation current Id may be configured to be less than 0, that is, the direction of the target excitation current Id is opposite to the direction of the actual excitation current Id0. In this manner, the strength of the stator magnetic field can be reduced, or the magnetic potential of the stator is reduced so that the magnetic resistance of the stator is reduced. Therefore, in the case where the external resistance remains unchanged, the resistance of the rotation of the rotor is reduced, thereby increasing the rotational speed of the electric motor and increasing the output power of the electric motor.

In S450, a target voltage vector of the electric motor is determined according to the target excitation current less than 0, the target torque current, and the actual current vector.

In S460, a control signal is generated according to the target voltage vector.

Specifically, after the target excitation current is configured to be less than 0, the target voltage vector of the electric motor may be determined according to the target excitation current less than 0, the target torque current, and the actual current vector. That is, the target excitation voltage is determined according to the target excitation current Id less than 0 and the actual excitation current Id0, and the target torque voltage is determined according to the target torque current Iq and the actual torque current Iq0.

Based on the principle the same as that in the preceding example, the target torque current Iq and the actual torque current Iq0 may be compared and adjusted through PI regulation to generate the target torque voltage Uq. The target torque voltage Uq can make the actual torque current Iq0 of the electric motor reach the target torque current Iq as quickly and stably as possible, and the target torque current Iq can control the rotational speed of the electric motor to reach the target rotational speed as quickly as possible. Moreover, the target excitation current Id less than 0 and the actual excitation current Id0 may be compared and adjusted through PI regulation to generate the target excitation voltage Ud. The target excitation voltage Ud can make the actual excitation current Id0 of the electric motor reach the target excitation current Id as quickly and stably as possible, thereby reducing the magnetic potential of the stator to further increase the rotational speed of the electric motor.

For example, when the amplitude of the power voltage signal is greater than the preset amplitude, it means that the power voltage signal outputted by the power supply device 16 is within the normal range. In this case, flux-weakening modulation may not be performed on the target excitation current Id, the target voltage vector is directly determined according to the acquired target excitation current Id, target torque current Iq, actual excitation current Id0, and actual torque current Iq0, and then the control signal is generated according to the target voltage vector.

In the control method for a power tool provided in the example of the present application, flux-weakening modulation is adopted to set the target excitation current to be less than 0 when the amplitude of the power voltage signal is too low, the target voltage vector of the electric motor is determined according to the target excitation current less than 0, the target torque current, and the actual current vector, and the control signal is generated according to the target voltage vector so that when the driver circuit drives the electric motor according to the control signal, the rotational speed of the electric motor can be increased, thereby increasing the output power of the electric motor, ensuring that the output power of the electric motor is not reduced due to too low a power supply voltage, and ensuring the normal use of the power tool at a low power supply voltage.

The example of the present application further provides a control device for a power tool. The control device for a power tool is used for performing the control method for a power tool provided in the preceding examples. The control device for a power tool may be implemented by software and/or hardware and may be integrated in the controller of the power tool. Therefore, the control device for a power tool provided in the example of the present application includes the technical features of the control method for a power tool provided in the preceding examples and can achieve the beneficial effects of the control method for a power tool provided in the preceding examples. For the similarities, reference may be made to the description of the control method for a power tool provided in examples one to three of the present application, and the details are not repeated here.

Figures 19, 20:
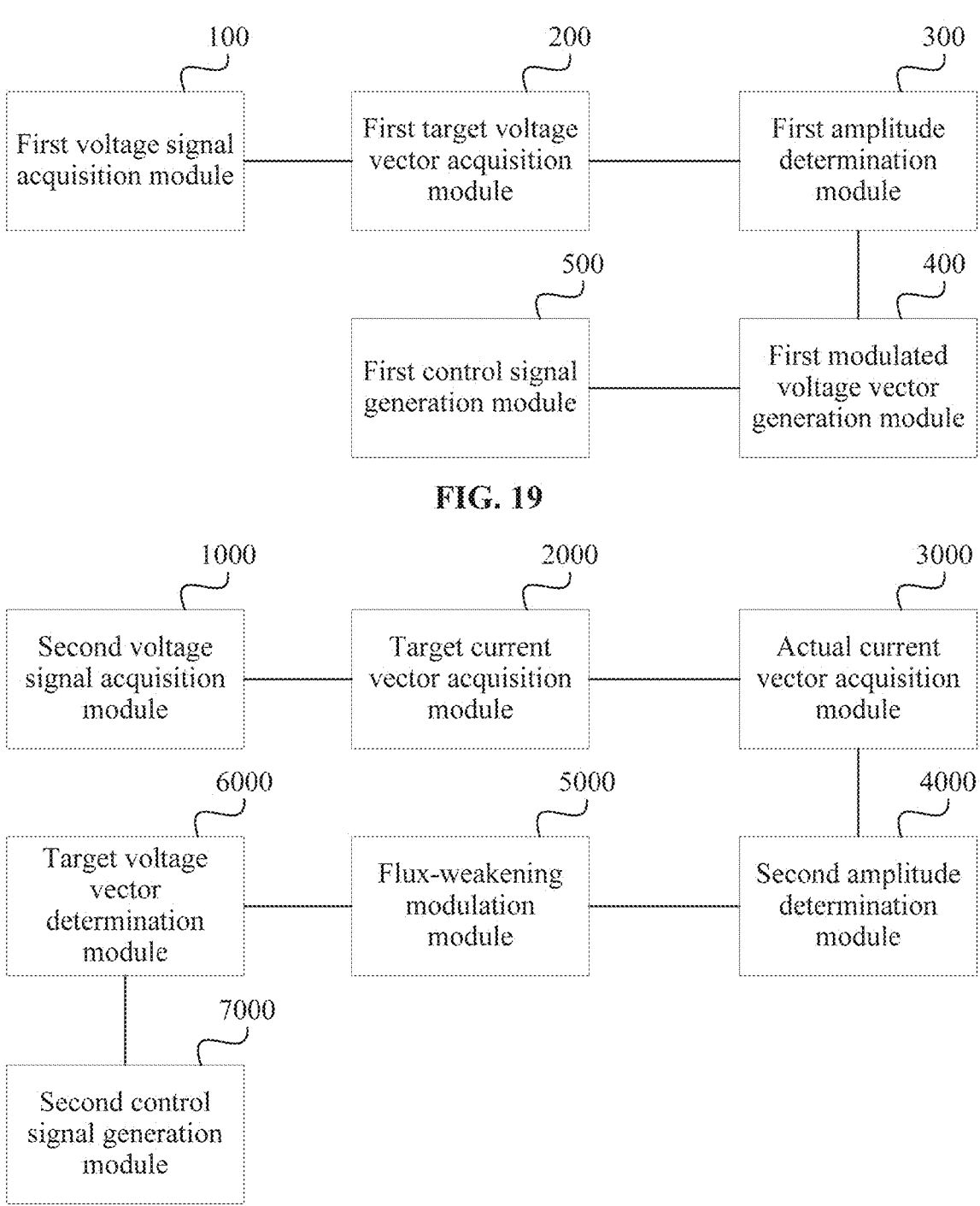
FIG. 19 is a structural diagram of a control device for a power tool according to example five of the present application.
FIG. 20 is a structural diagram of a control device for a power tool according to example six of the present application.

FIG. 19 is a structural diagram of a control device for a power tool according to an example of the present application. As shown in FIG. 19, the control device for a power tool includes a first voltage signal acquisition module 100 for acquiring the power voltage signal outputted by the power supply device; a first target voltage vector acquisition module 200 for acquiring the target voltage vector provided to the electric motor; a first amplitude determination module 300 for determining whether the amplitude of the power voltage signal does not exceed the preset amplitude; a first modulated voltage vector generation module 400 for over-modulating the target voltage vector and generating the modulated voltage vector when the first amplitude determination module determines that the amplitude of the power voltage signal does not exceed the preset amplitude; and a first control signal generation module 500 for generating the control signal according to the modulated voltage vector.

For the control device for a power tool provided in the example of the present application, when the amplitude of the power voltage signal is too low, the torque of the electric motor is increased through overmodulation, thereby increasing the output power of the electric motor, ensuring that the output power of the electric motor is not reduced due to too low a power supply voltage, and ensuring the normal use of the power tool at a low power supply voltage.

Optionally, the control device for a power tool further includes a rotational direction signal acquisition module for acquiring the rotational direction signal of the electric motor before the first modulated voltage vector generation module overmodulates the target voltage vector and generates the modulated voltage vector; a rotational direction determination module for determining whether the rotational direction of the electric motor is reverse according to the rotational direction signal; and a second modulated voltage vector generation module for overmodulating the target voltage vector and generating the modulated voltage vector when the rotational direction determination module determines that the rotational direction of the electric motor is reverse according to the rotational direction signal.

Optionally, the first target voltage vector acquisition module includes a target current vector acquisition unit for acquiring the target current vector of the electric motor; an actual current vector acquisition unit for acquiring the actual current vector of the electric motor; and a target voltage vector determination unit for determining the target voltage vector according to the target current vector and the actual current vector.

Optionally, the target current vector acquisition unit includes a rotational speed acquisition subunit for acquiring the real-time rotational speed and the target rotational speed of the electric motor; a target current determination subunit for determining the target current according to the real-time rotational speed and the target rotational speed; and a target current vector determination unit for determining the target excitation current and the target torque current according to the target current.

The actual current vector acquisition unit includes a detection current acquisition subunit for acquiring the detection current of the electric motor; and an actual current vector determination subunit for determining the actual excitation current and the actual torque current according to the detection current.

Optionally, the target voltage vector determination unit includes a target excitation voltage determination subunit for determining the target excitation voltage according to the target excitation current and the actual excitation current. A target torque voltage determination subunit is used for determining the target torque voltage according to the target torque current and the actual torque current.

The example of the present application further provides a control device for a power tool. The control device for a power tool is used for performing the control method for a power tool provided in example four of the present application. The control device for a power tool may be implemented by software and/or hardware and may be integrated in the controller of the power tool. Therefore, the control device for a power tool provided in the example of the present application includes the technical features of the control method for a power tool provided in example four of the present application and can achieve the beneficial effects of the control method for a power tool provided in example four of the present application. For the similarities, reference may be made to the description of the control method for a power tool provided in example four of the present application, and the details are not repeated here.

FIG. 20 is a structural diagram of a control device for a power tool according to an example of the present application. As shown in FIG. 20, the control device for a power tool includes a second voltage signal acquisition module 1000 for the controller to acquire the power voltage signal outputted by the power supply device; a target current vector acquisition module 2000 for acquiring the target current vector of the electric motor, where the target current vector includes the target excitation current and the target torque current; an actual current vector acquisition module 3000 for acquiring the actual current vector of the electric motor, where the actual current vector includes the actual excitation current and the actual torque current; a second amplitude determination module 4000 for determining whether the amplitude of the power voltage signal does not exceed the preset amplitude; a flux-weakening modulation module 5000 for configuring the target excitation current to be less than 0 when the second amplitude determination module 4000 determines that the amplitude of the power voltage signal does not exceed the preset amplitude; a target voltage vector determination module 6000 for determining the target voltage vector of the electric motor according to the target excitation current less than 0, the target torque current, and the actual current vector; and a second control signal generation module 7000 for generating the control signal according to the target voltage vector.

In the control method for a power tool provided in the example of the present application, when the amplitude of the power voltage signal is too low, the target excitation current is configured to be less than 0 through flux-weakening modulation so that the rotational speed of the electric motor is increased, thereby increasing the output power of the electric motor, ensuring that the output power of the electric motor is not reduced due to too low a power supply voltage, and ensuring the normal use of the power tool at a low power supply voltage.

Optionally, the target current vector acquisition module includes a rotational speed acquisition unit for acquiring the real-time rotational speed and the target rotational speed of the electric motor; a target current determination unit for determining the target current according to the real-time rotational speed and the target rotational speed; and a target current vector determination unit for determining the target excitation current and the target torque current according to the target current.

The actual current vector acquisition module includes a detection current acquisition unit for acquiring the detection current of the electric motor; and an actual current vector determination unit for determining the actual excitation current and the actual torque current according to the detection current.

It is to be understood that various forms of the preceding flows may be used with steps reordered, added, or deleted. For example, the steps described in the present application may be executed in parallel, in sequence, or in a different order as long as the desired results of the technical solutions in the present application can be achieved. The execution sequence of these steps is not limited herein.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A power tool, comprising:
a housing;
an electric motor disposed in the housing and comprising stator windings and a rotor rotating about the stator windings;
a power supply device;
a controller electrically connected to the power supply device;
a driver circuit, receiving a power signal from the power supply device and outputting a drive signal to the electric motor according to the power signal and a control signal provided by the controller, comprising a plurality of electronic switches electrically connected between the power supply device and the electric motor each having a control terminal electrically connected to the controller;
a first capacitor connected in parallel between the power supply device and the driver circuit; and
a voltage collection device used for collecting a bus voltage signal at a front end of the driver circuit and transmitting the bus voltage signal to the controller;
wherein the controller comprises an amplitude acquisition module and a first control signal adjustment module, the amplitude acquisition module receives the bus voltage signal provided by the voltage collection device and determines an amplitude of a bus voltage according to the bus voltage signal and the first control signal adjustment module controls a duty cycle of the control signal to decrease when the amplitude of the bus voltage is greater than a preset amplitude.

2. The power tool of claim 1, wherein a ratio of capacitance of the first capacitor to output power of the power tool does not exceed 0.1 μF/W.

3. The power tool of claim 1, wherein the first control signal adjustment module comprises: a first voltage regulation unit for controlling an amplitude of a target voltage to decrease when the amplitude of the bus voltage is greater than the preset amplitude; and a first control signal generation unit for generating the control signal according to the decreased target voltage.

4. The power tool of claim 1, wherein the controller further comprises a second control signal adjustment module and the second control signal adjustment module is used for controlling the duty cycle of the control signal to increase when the amplitude of the bus voltage is less than the preset amplitude.

5. The power tool of claim 4, wherein the second control signal adjustment module comprises: a second voltage regulation unit for controlling an amplitude of a target voltage to increase when the amplitude of the bus voltage is less than the preset amplitude; and a second control signal generation unit for generating the control signal according to the increased target voltage.

6. The power tool of claim 1, further comprising a current detection module, a rotational speed detection module, and a target rotational speed acquisition module; wherein the current detection module is used for acquiring a sampled current of the electric motor and outputting the sampled current to the controller, the rotational speed detection module is used for acquiring a real-time rotational speed of the electric motor and sending the real-time rotational speed to the controller, and the target rotational speed acquisition module is used for acquiring a target rotational speed of the electric motor and sending the target rotational speed to the controller.

7. The power tool of claim 6, wherein the controller further comprises a target voltage acquisition module for acquiring a target voltage according to the sampled current, the real-time rotational speed, and the target rotational speed.

8. The power tool of claim 7, wherein the target voltage acquisition module comprises: a direct-axis target voltage acquisition unit for acquiring a direct-axis target voltage according to a direct-axis target current and a direct-axis feedback current; and a quadrature-axis target voltage acquisition unit for acquiring a quadrature-axis target voltage according to a quadrature-axis target current and a quadrature-axis feedback current.

9. The power tool of claim 8, wherein the target voltage acquisition module comprises a target current acquisition unit and a feedback current acquisition unit, the target current acquisition unit is used for acquiring the real-time rotational speed and the target rotational speed of the electric motor and acquiring the direct-axis target current and the quadrature-axis target current according to the target rotational speed and the real-time rotational speed, and the feedback current acquisition unit is used for acquiring the sampled current of the electric motor and acquiring the direct-axis feedback current and the quadrature-axis feedback current according to the real-time rotational speed.

10. The power tool of claim 3, wherein the first control signal generation unit comprises: a first control quantity acquisition subunit for acquiring a first voltage control quantity and a second voltage control quantity according to the decreased target voltage; and a first control signal generation subunit for acquiring the control signal according to the first voltage control quantity and the second voltage control quantity.

11. A power tool comprising:
a housing;
an electric motor disposed in the housing and comprising stator windings and a rotor rotating about the stator windings;
a power supply device;
a controller electrically connected to the power supply device;
a driver circuit, outputting a drive signal to the electric motor according to a power signal and a control signal provided by the controller, comprising a plurality of electronic switches electrically connected between the power supply device and the electric motor each having a control terminal electrically connected to the controller; and
a current detection module used for acquiring a detection current of the electric motor and sending the detection current to the controller;

wherein the controller comprises a detection current acquisition module, a vector detection current acquisition module, and a first control module, the detection current acquisition module is used for acquiring the detection current provided by the current detection module, the vector detection current acquisition module is used for acquiring an actual torque current and an actual excitation current of the electric motor according to the detection current, and the first control module is used for controlling the plurality of electronic switches to be turned off simultaneously in a current control cycle when the actual torque current in a previous control cycle is greater than a first current threshold and/or when the actual excitation current in a previous control cycle is greater than a second current threshold.

12. The power tool of claim 11, wherein the first control module is further used for controlling the plurality of electronic switches to be turned on in groups in a next control cycle after the current control cycle ends.

13. The power tool of claim 11, wherein the first control module is further used for, after controlling the plurality of electronic switches to be turned off simultaneously in the current control cycle when determining that the actual torque current in the current control cycle does not exceed the first current threshold and the actual excitation current in the current control cycle does not exceed the second current threshold, controlling the plurality of electronic switches to be turned on in groups in a next control cycle.

14. A power tool comprising:
a housing;
a power supply device;
a controller electrically connected to the power supply device;
an electric motor disposed in the housing and comprising stator windings and a rotor rotating about the stator windings;
a driver circuit, outputting a drive signal to the electric motor according to a power signal and a control signal provided by the controller, comprising a plurality of electronic switches electrically connected between the power supply device and the electric motor each having a control terminal electrically connected to the controller; and
a current detection module used for acquiring a detection current of the electric motor and sending the detection current to the controller;

wherein the controller comprises a detection current acquisition module, a vector detection current acquisition module, and a second control module, the detection current acquisition module is used for acquiring the detection current provided by the current detection module, the vector detection current acquisition module is used for acquiring an actual torque current and an actual excitation current of the electric motor according to the detection current, and the second control module is used for, when the actual torque current in a current control cycle is greater than a first current threshold and/or when the actual excitation current in a current control cycle is greater than a second current threshold, controlling the plurality of electronic switches to be turned off simultaneously during remaining time in the current control cycle.

15. The power tool of claim 14, wherein the second control module is further used for controlling the plurality of electronic switches to be turned on in groups in a next control cycle after the current control cycle ends.

16. The power tool of claim 14, wherein the second control module is further used for, after controlling the plurality of electronic switches to be turned off simultaneously in the current control cycle, when determining that the actual torque current in a next control cycle does not exceed the first current threshold and the actual excitation current in the next control cycle does not exceed the second current threshold, controlling the plurality of electronic switches to be turned on in groups in the next control cycle.

17. The power tool of claim 14, further comprising a rotational speed detection module and a target rotational speed acquisition module; wherein the rotational speed detection module is used for acquiring a real-time rotational speed of the electric motor and sending the real-time rotational speed to the controller, and the target rotational speed acquisition module is used for acquiring a target rotational speed of the electric motor and sending the target rotational speed to the controller.

18. The power tool of claim 17, wherein the controller further comprises: a target current acquisition module for acquiring the real-time rotational speed and the target rotational speed of the electric motor and determining a target current according to the target rotational speed; and a vector target current acquisition module for acquiring a target torque current and a target excitation current according to the target current.

19. The power tool of claim 17, wherein when the controller comprises a first control module, the first control module comprises: a target torque voltage acquisition unit for acquiring a target torque voltage according to a target torque current and the actual torque current in the current control cycle; a target excitation voltage acquisition unit for acquiring a target excitation voltage according to a target excitation current and the actual excitation current in the current control cycle; a first control quantity generation control unit for generating a first voltage control quantity and a second voltage control quantity according to the actual torque current and the actual excitation current in a previous control cycle and the target torque voltage and the target excitation voltage in the current control cycle; and a first PWM control signal generation unit for outputting a pulse-width modulation (PWM) control signal according to the first voltage control quantity and the second voltage control quantity.

20. The power tool of claim 17, wherein when the controller comprises a second control module, the second control module comprises: a direct-axis target voltage acquisition unit for acquiring a target torque voltage according to a target torque current and the actual torque current in the current control cycle; a target excitation voltage acquisition unit for acquiring a target excitation voltage according to a target excitation current and the actual excitation current in the current control cycle; a second control quantity generation control unit for generating a third voltage control quantity and a fourth voltage control quantity according to the actual torque current, the actual excitation current, the target torque voltage, and the target excitation voltage in the current control cycle; and a second PWM control signal generation unit for outputting a PWM control signal according to the third voltage control quantity and the fourth voltage control quantity.

* * * * *